United States Patent
Chen

(10) Patent No.: US 11,252,753 B2
(45) Date of Patent: Feb. 15, 2022

(54) METHOD AND APPARATUS FOR IMPROVING RETRANSMISSION SCHEDULING OF SIDELINK COMMUNICATION IN A WIRELESS COMMUNICATION SYSTEM

(71) Applicant: ASUSTek Computer Inc., Taipei (TW)

(72) Inventor: Wei-Yu Chen, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 50 days.

(21) Appl. No.: 16/797,577

(22) Filed: Feb. 21, 2020

(65) Prior Publication Data
US 2020/0275474 A1    Aug. 27, 2020

Related U.S. Application Data

(60) Provisional application No. 62/808,482, filed on Feb. 21, 2019.

(51) Int. Cl.
| | |
|---|---|
| *H04W 72/12* | (2009.01) |
| *H04W 72/14* | (2009.01) |
| *H04L 1/18* | (2006.01) |
| *H04L 1/08* | (2006.01) |
| *H04L 1/16* | (2006.01) |

(Continued)

(52) U.S. Cl.
CPC .......... *H04W 72/1289* (2013.01); *H04L 1/08* (2013.01); *H04L 1/1607* (2013.01); *H04L 1/1812* (2013.01); *H04W 72/14* (2013.01); *H04W 4/40* (2018.02); *H04W 92/18* (2013.01)

(58) Field of Classification Search
CPC ............. H04W 72/1289; H04W 72/14; H04W 72/042; H04L 1/1607; H04L 1/1812; H04L 1/08
See application file for complete search history.

(56) References Cited

U.S. PATENT DOCUMENTS

| | | | |
|---|---|---|---|
| 8,462,803 B2 | 6/2013 | Susitaival et al. | |
| 2018/0198572 A1 | 7/2018 | Wang et al. | |
| 2019/0052416 A1* | 2/2019 | Babaei | H04L 1/188 |

(Continued)

OTHER PUBLICATIONS

Notice of Submission of Opinion from Korean Intellectual Property Office in corresponding KR Application No. 10-2020-0021333, dated May 28, 2021.

(Continued)

*Primary Examiner* — Min Jung
(74) *Attorney, Agent, or Firm* — Skaar Ulbrich Macari, P.A.

(57) ABSTRACT

Methods and apparatuses for improving retransmission scheduling of sidelink communications are disclosed herein. In one method, a first device monitors a down control signal for scheduling sidelink resource. The first device performs a sidelink transmission for a second device based on a first sidelink grant allocated by a base station. The first device determines a retransmission need of the sidelink transmission based on a Hybrid Automatic Repeat Request (HARQ) feedback of the sidelink transmission from the second device. The first device transmits a retransmission indication for the retransmission need to the base station. The first device starts or restarts a timer upon the transmission of the retransmission indication, wherein the timer is used for controlling a period of monitoring a downlink control resource set.

18 Claims, 12 Drawing Sheets

(51) Int. Cl.
*H04W 4/40* (2018.01)
*H04W 92/18* (2009.01)

(56) References Cited

U.S. PATENT DOCUMENTS

| | | | | |
|---|---|---|---|---|
| 2020/0007297 A1* | 1/2020 | Hong | .................... | H04L 5/0053 |
| 2020/0029385 A1* | 1/2020 | Bergstrom | ............ | H04W 72/14 |
| 2020/0092692 A1* | 3/2020 | Wang | ...................... | H04W 4/40 |
| 2020/0228290 A1* | 7/2020 | Baghel | .................. | H04L 5/0053 |
| 2020/0229171 A1* | 7/2020 | Khoryaev | ............. | H04W 72/08 |
| 2020/0236694 A1* | 7/2020 | Wu | ................... | H04W 72/1289 |
| 2020/0295883 A1* | 9/2020 | Lee | ....................... | H04L 5/0057 |
| 2020/0351855 A1* | 11/2020 | Kung | .................... | H04L 1/1812 |
| 2021/0160014 A1* | 5/2021 | Selvanesan | ........... | H04W 76/11 |

OTHER PUBLICATIONS

CMCC, Discussion on HARQ feedback for NR V2X, Discussion and Decision, R1-1902330, 3GPP TSG RAN WG1#96, Athens, Greece, Feb. 25-Mar. 1, 2019.
NTT Docomo, Inc., Report of email discussion [101#51][LTE/MTC R13] DRX for MTC, Discussion, R2-1805187, 3GPP TSG-RAN WG2 Meeting #101 bis, Sanya, China, Apr. 16-21, 2018.
Nokia, Nokia Shanghai Bell, "Discussion on Sidelink groupcast HARQ", Discussion and Decision, R1-1902916, 3GPP TSG-RAN WG1 Meeting #96, Athens, Greece, Feb. 25-Mar. 1, 2019.

* cited by examiner

| Destination index₁ | LCG ID₁ | Buffer Size₁ | Oct 1 |
| Buffer Size₁ | Destination index₂ | | Oct 2 |
| LCG ID₂ | Buffer Size₂ | | Oct 3 |
| ... | | | |
| Destination index$_{N-1}$ | LCG ID$_{N-1}$ | Buffer Size$_{N-1}$ | Oct 1.5*N-2 |
| Buffer Size$_{N-1}$ | Destination index$_N$ | | Oct 1.5*N-1 |
| LCG ID$_N$ | Buffer Size$_N$ | | Oct 1.5*N |

FIG. 5

(PRIOR ART)

| Destination index₁ | LCG ID₁ | Buffer Size₁ | Oct 1 |
| Buffer Size₁ | Destination index₂ | | | | Oct 2 |
| LCG ID₂ | Buffer Size₂ | | | | Oct 3 |
| ... | | | | | |
| Destination index$_N$ | LCG ID$_N$ | Buffer Size$_N$ | | | Oct 1.5*N-0.5 |
| Buffer Size$_N$ | R | R | R | R | Oct 1.5*N+0.5 |

FIG. 6

(PRIOR ART)

R/R/E/LCID sub-header

METHOD AND APPARATUS FOR IMPROVING RETRANSMISSION SCHEDULING OF SIDELINK COMMUNICATION IN A WIRELESS COMMUNICATION SYSTEM

CROSS-REFERENCE TO RELATED APPLICATIONS

The present application claims the benefit of U.S. Provisional Patent Application Ser. No. 62/808,482 filed on Feb. 21, 2019, the entire disclosure of which is incorporated herein in its entirety by reference.

FIELD

This disclosure generally relates to wireless communication networks, and more particularly, to a method and apparatus for improving retransmission scheduling of sidelink communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In one method, a first device monitors a down control signal for scheduling sidelink resource. The first device performs a sidelink transmission for a second device based on a first sidelink grant allocated by a base station. The first device determines a retransmission need of the sidelink transmission based on a Hybrid Automatic Repeat Request (HARQ) feedback of the sidelink transmission from the second device. The first device transmits a retransmission indication for the retransmission need to the base station. The first device starts or restarts a timer upon the transmission of the retransmission indication, wherein the timer is used for controlling a period of monitoring a downlink control resource set.

BRIEF DESCRIPTION OF THE DRAWINGS

FIG. 5 is a reproduction of Figure 6.1.3.1a-1 showing Sidelink BSR and Truncated Sidelink BSR MAC control element for even N taken from 3GPP TS 36.321-f30.

FIG. 6 is a reproduction of Figure 6.1.3.1a-2: Sidelink BSR and Truncated Sidelink BSR MAC control element for odd N taken from 3GPP TS 36.321-f30.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: TS 36.321-f30; RAN1#94 chairman's note; TS 38.321-f40; TS 38.321-f40; and RAN1#adhoc1901 Chairman's Note. The standards and documents listed above are hereby expressly incorporated by reference in their entirety.

Figure 1:
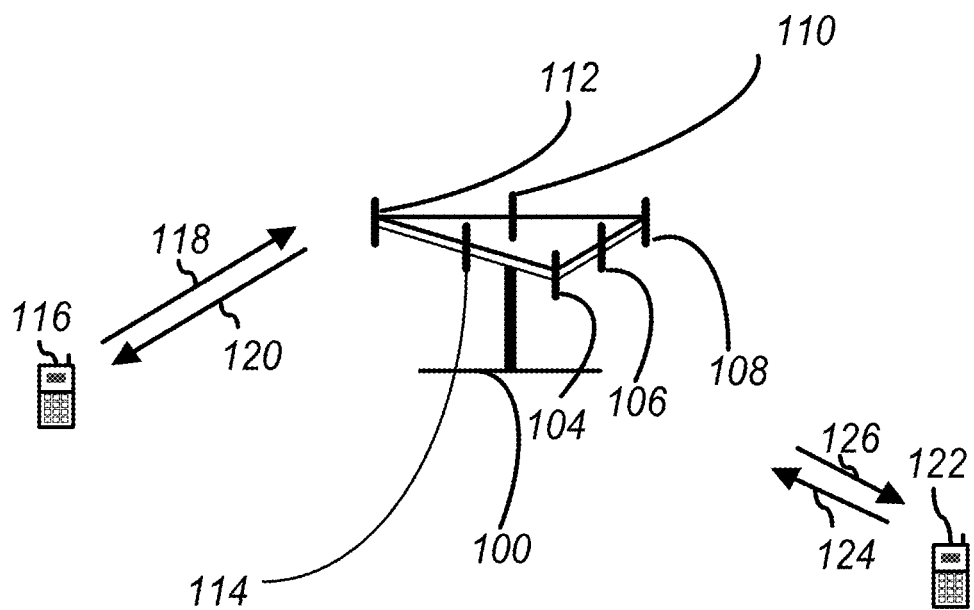
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
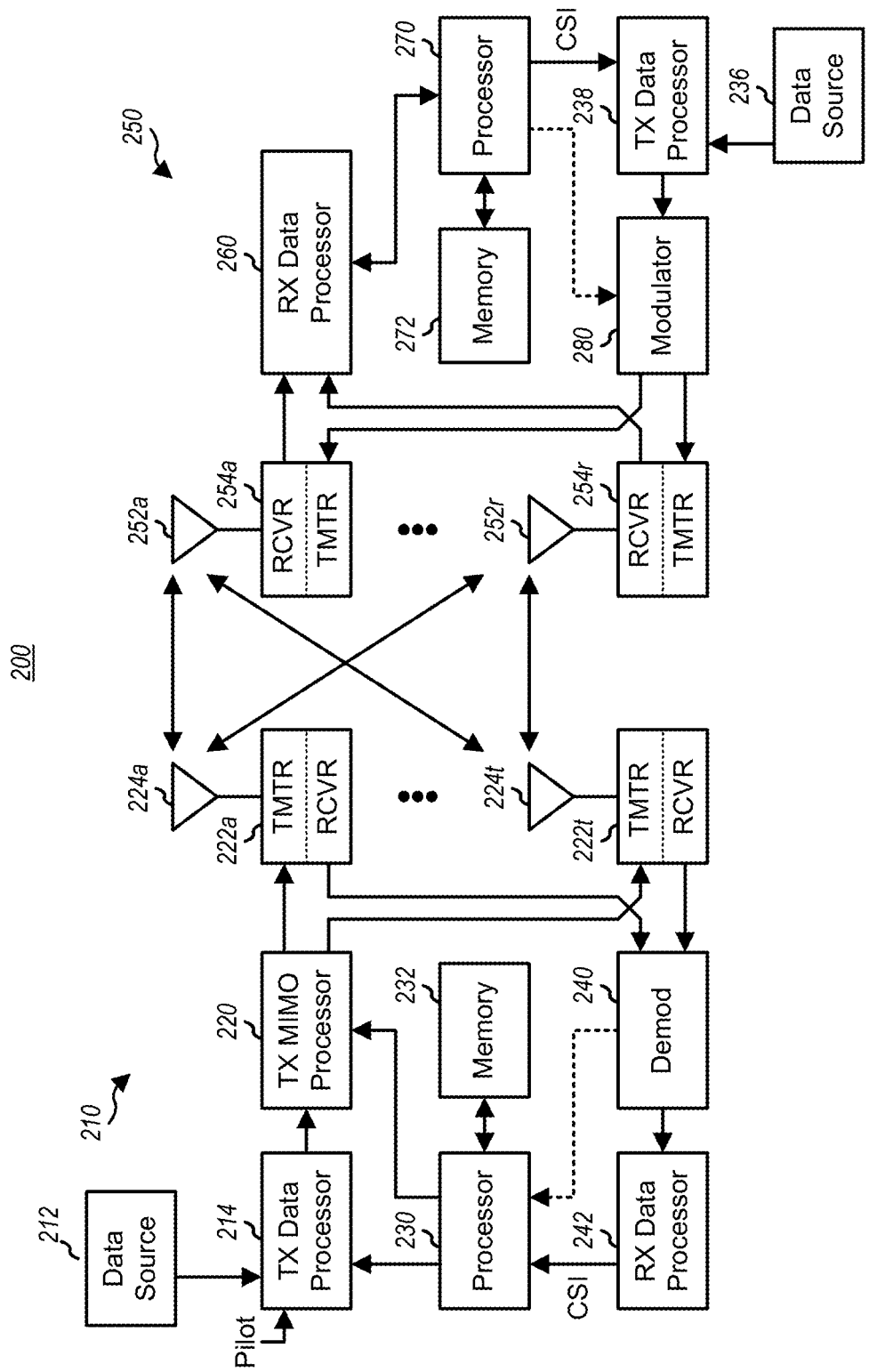
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
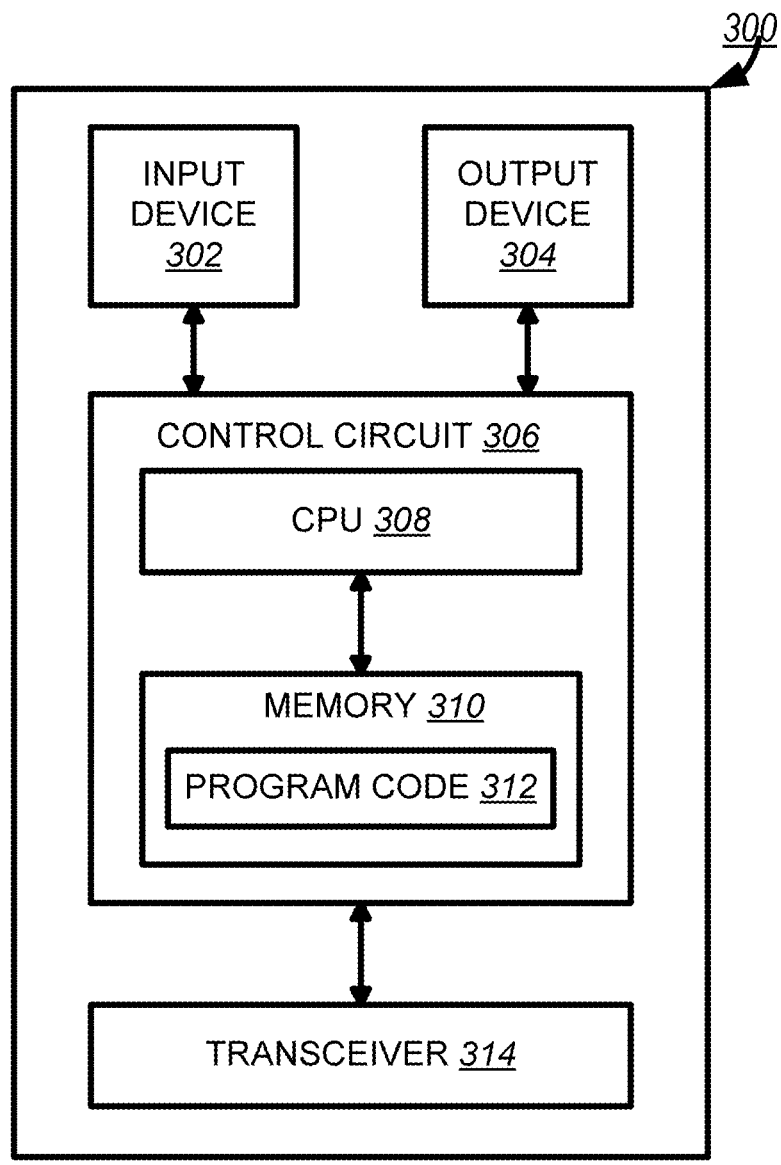
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
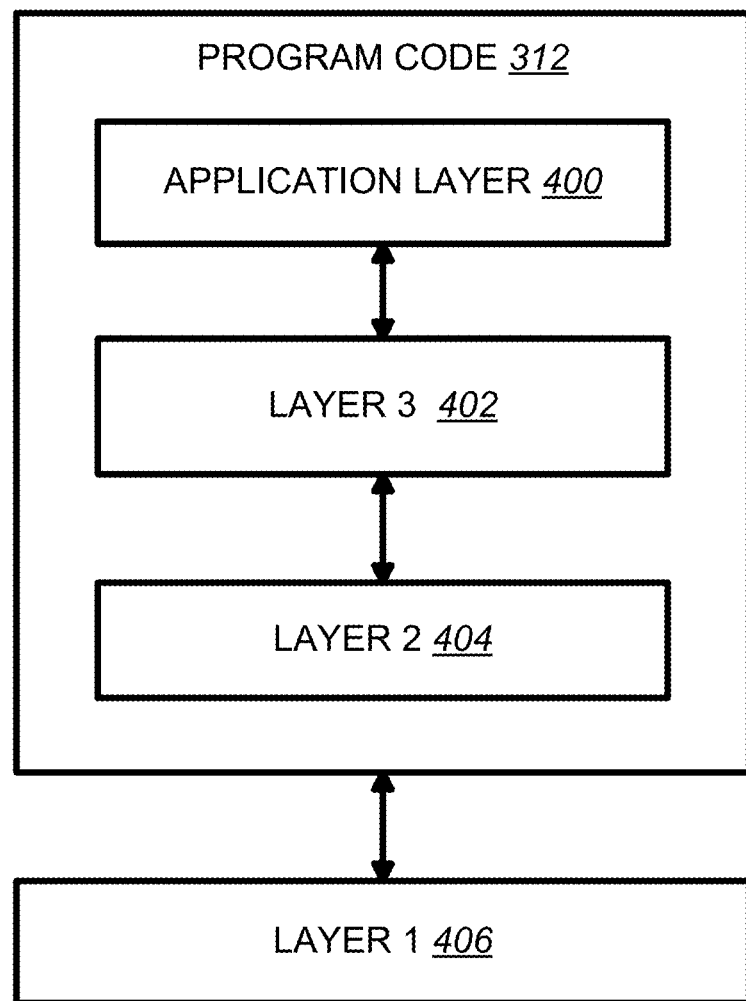
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Sidelink resource allocation and utilization mechanism in current MAC specification is disclosed in 3GPP TS36.321-f30 and is quoted below:

5.4.4 Scheduling Request

The Scheduling Request (SR) is used for requesting UL-SCH resources for new transmission.

When an SR is triggered, it shall be considered as pending until it is cancelled. All pending SR(s) shall be cancelled and sr-ProhibitTimer and ssr-ProhibitTimer shall be stopped when a MAC PDU is assembled and this PDU includes a BSR which contains buffer status up to (and including) the last event that triggered a BSR (see subclause 5.4.5), or, if all pending SR(s) are triggered by Sidelink BSR, when a MAC PDU is assembled and this PDU includes a Sidelink BSR which contains buffer status up to (and including) the last event that triggered a Sidelink BSR (see subclause 5.14.1.4), or, if all pending SR(s) are triggered by Sidelink BSR, when upper layers configure autonomous resource selection, or when the UL grant(s) can accommodate all pending data available for transmission.

If the MAC entity has resources for SR configured on only one of SPUCCH and PUCCH, that SR resource is valid for all logical channels. If the MAC entity has resources for SR configured on both PUCCH and SPUCCH, MAC entity shall consider all logical channels that have triggered an SR (and at retxBSR-Timer expiry, MAC entity shall consider all logical channels, belonging to a LCG, with data available for transmission):

PUCCH resources for SR are valid if logicalChannelSr-Restriction is not configured, or if logicalChannelSr-Restriction allows SR on PUCCH, for any of the logical channels;

SPUCCH resources for SR are valid if logicalChannelSr-Restriction is not configured, or if logicalChannelSr-Restriction allows SR on SPUCCH, for any of the logical channels.

If an SR is triggered and there is no other SR pending, the MAC entity shall set the SR_COUNTER and the SSR_COUNTER to 0.

As long as one SR is pending, the MAC entity shall for each TTI:

if no UL-SCH resources are available for a transmission in this TTI:

Except for NB-IoT:

if the MAC entity has no valid PUCCH nor valid SPUCCH resource for SR configured in any TTI:

if the MAC entity is a MCG MAC entity and rach-Skip is not configured; or if the MAC entity is a SCG MAC entity and rach-SkipSCG is not configured:

initiate a Random Access procedure (see subclause 5.1) on the corresponding SpCell and cancel all pending SRs;

else if this TTI is not part of a measurement gap or Sidelink Discovery Gap for Transmission, and if transmission of V2X sidelink communication is not prioritized in this TTI as described in subclause 5.14.1.2.2:

if the MAC entity has at least one valid SPUCCH resource for SR configured for this TTI and if ssr-ProhibitTimer is not running:

if SSR_COUNTER < dssr-TransMax:

increment SSR_COUNTER by 1;

instruct the physical layer to signal the SR on one valid SPUCCH resource for SR;

start the ssr-ProhibitTimer.

else:

notify RRC to release SPUCCH for all serving cells;

if the MAC entity has no valid PUCCH resource for SR configured in any TTI:

notify RRC to release PUCCH for all serving cells;

notify RRC to release SRS for all serving cells;

clear any configured downlink assignments and uplink grants;

initiate a Random Access procedure (see subclause 5.1) on the SpCell and cancel all pending SRs.

if the MAC entity has at least one valid PUCCH resource for SR configured for this TTI and if sr-ProhibitTimer is not running:

if SR_COUNTER < dsr-TransMax:

increment SR_COUNTER by 1;

instruct the physical layer to signal the SR on one valid PUCCH resource for SR;

start the sr-ProhibitTimer.

else:

notify RRC to release PUCCH and SPUCCH for all serving cells;

notify RRC to release SRS for all serving cells;

clear any configured downlink assignments and uplink grants;

initiate a Random Access procedure (see subclause 5.1) on the SpCell and cancel all pending SRs.

For NB-IoT:

if the MAC entity has no valid resource for SR together with acknowledgement of the data in this TTI and no valid PRACH resource for SR configured in any TTI:

initiate a Random Access Procedure (see subclause 5.1) and cancel all pending SRs.

else:

if the MAC entity has valid resource for SR together with acknowledgement of the data in this TTI:

instruct the physical layer to signal the SR together with acknowledgement of the data.

else:

if the MAC entity has valid PRACH resource for SR configured in this TTI and sr-ProhibitTimer is not running:

instruct the physical layer to signal the SR on one valid PRACH resource for SR.

start the sr-ProhibitTimer in the subframe containing the last repetition of the corresponding SR transmission.

NOTE 1: The selection of which valid PUCCH/SPUCCH resource for SR to signal SR on when the MAC entity has more than one valid PUCCH/SPUCCH resource for SR in one TTI or overlapping TTIs is left to UE implementation.

NOTE 2: SR_COUNTER is incremented for each SR bundle. sr-ProhibitTimer is started in the first TTI of an SR bundle.

[ . . . ]

5.7 Discontinuous Reception (DRX)

The MAC entity may be configured by RRC with a DRX functionality that controls the UE's PDCCH monitoring activity for the MAC entity's C-RNTI, TPC-PUCCH-RNTI, TPC-PUSCH-RNTI, Semi-Persistent Scheduling C-RNTI (if configured), UL Semi-Persistent Scheduling V-RNTI (if configured), eIMTA-RNTI (if configured), SL-RNTI (if configured), SL-V-RNTI (if configured), CC-RNTI (if configured), SRS-TPC-RNTI (if configured), and AUL C-RNTI (if configured). When in RRC_CONNECTED, if DRX is configured, the MAC entity is allowed to monitor the PDCCH discontinuously using the DRX operation specified in this subclause; otherwise the MAC entity monitors the PDCCH continuously. When using DRX operation, the MAC entity shall also monitor PDCCH according to requirements found in other subclauses of this specification. RRC controls DRX operation by configuring the timers onDurationTimer, drx-InactivityTimer, drx-Retransmission Timer (for HARQ processes scheduled using 1 ms TTI, one per DL HARQ process except for the broadcast process), drx-RetransmissionTimerShortTTI (for HARQ processes scheduled using short TTI, one per DL HARQ process), drx-ULRetransmissionTimer (for HARQ processes scheduled using 1 ms TTI, one per asynchronous UL HARQ process), drx-ULRetransmissionTimerShortTTI (for HARQ processes scheduled using short TTI, one per asynchronous UL HARQ process), the longDRX-Cycle, the value of the drxStartOffset and optionally the drxShortCycleTimer and shortDRX-Cycle. A HARQ RTT timer per DL HARQ process (except for the broadcast process) and UL HARQ RTT Timer per asynchronous UL HARQ process is also defined (see subclause 7.7).

When a DRX cycle is configured, the Active Time includes the time while:
- onDurationTimer or drx-InactivityTimer or drx-Retransmission Timer or drx-RetransmissionTimerShortTTI or drx-ULRetransmissionTimer or drx-ULRetransmissionTimerShortTTI or mac-ContentionResolutionTimer (as described in subclause 5.1.5) is running; or
- a Scheduling Request is sent on PUCCH/SPUCCH and is pending (as described in subclause 5.4.4); or
- an uplink grant for a pending HARQ retransmission can occur and there is data in the corresponding HARQ buffer for synchronous HARQ process; or
- a PDCCH indicating a new transmission addressed to the C-RNTI of the MAC entity has not been received after successful reception of a Random Access Response for the preamble not selected by the MAC entity (as described in subclause 5.1.4); or
- mpdcch-UL-HARQ-ACK-FeedbackConfig is configured and repetitions within a bundle are being transmitted according to UL_REPETITION_NUMBER.

When DRX is configured, the MAC entity shall for each subframe:
- if a HARQ RTT Timer expires in this subframe:
  - if the data of the corresponding HARQ process was not successfully decoded:
    - start the drx-RetransmissionTimer or drx-RetransmissionTimerShortTTI for the corresponding HARQ process;
  - if NB-IoT, start or restart the drx-InactivityTimer.
- if an UL HARQ RTT Timer expires in this subframe:
  - start the drx-ULRetransmissionTimer or drx-ULRetransmissionTimerShortTTI for the corresponding HARQ process.
  - if NB-IoT, start or restart the drx-InactivityTimer.
- if a DRX Command MAC control element or a Long DRX Command MAC control element is received:
  - stop onDurationTimer;
  - stop drx-InactivityTimer.
- if drx-InactivityTimer expires or a DRX Command MAC control element is received in this subframe:
  - if the Short DRX cycle is configured:
    - start or restart drxShortCycleTimer;
    - use the Short DRX Cycle.
  - else:
    - use the Long DRX cycle.
- if drxShortCycleTimer expires in this subframe:
  - use the Long DRX cycle.
- if a Long DRX Command MAC control element is received:
  - stop drxShortCycleTimer;
  - use the Long DRX cycle.
- If the Short DRX Cycle is used and [(SFN*10)+subframe number] modulo (shortDRX-Cycle)=(drxStartOffset) modulo (shortDRX-Cycle); or
- if the Long DRX Cycle is used and [(SFN*10)+subframe number] modulo (longDRX-Cycle)=drxStartOffset:
  - if NB-IoT:
    - if there is at least one HARQ process for which neither HARQ RTT Timer nor UL HARQ RTT Timer is running, start onDurationTimer.
  - else:
    - start onDurationTimer.
- during the Active Time, for a PDCCH-subframe, if the subframe is not required for uplink transmission for half-duplex FDD UE operation, and if the subframe is not a half-duplex guard subframe [7] and if the subframe is not part of a configured measurement gap and if the subframe is not part of a configured Sidelink Discovery Gap for Reception, and for NB-IoT if the subframe is not required for uplink transmission or downlink reception other than on PDCCH; or
- during the Active Time, for a subframe other than a PDCCH-subframe and for a UE capable of simultaneous reception and transmission in the aggregated cells, if the subframe is a downlink subframe indicated by a valid eIMTA L1 signalling for at least one serving cell not configured with schedulingCellId [8] and if the subframe is not part of a configured measurement gap and if the subframe is not part of a configured Sidelink Discovery Gap for Reception; or
- during the Active Time, for a subframe other than a PDCCH-subframe and for a UE not capable of simultaneous reception and transmission in the aggregated cells, if the subframe is a downlink subframe indicated by a valid eIMTA L1 signalling for the SpCell and if the subframe is not part of a configured measurement gap and if the subframe is not part of a configured Sidelink Discovery Gap for Reception:
  - monitor the PDCCH;
  - if the PDCCH indicates a DL transmission or if a DL assignment has been configured for this subframe:
    - if the UE is an NB-IoT UE, a BL UE or a UE in enhanced coverage:
      - start the HARQ RTT Timer for the corresponding HARQ process in the subframe containing the last repetition of the corresponding PDSCH reception;

else:
    start the HARQ RTT Timer for the corresponding HARQ process;
    stop the drx-RetransmissionTimer or drx-RetransmissionTimerShortTTI for the corresponding HARQ process.
    if NB-IoT, stop drx-ULRetransmissionTimer for all UL HARQ processes.
if the PDCCH indicates an UL transmission for an asynchronous HARQ process or if an UL grant has been configured for an asynchronous HARQ process for this subframe, or if the PDCCH indicates an UL transmission for an autonomous HARQ process or;
if the uplink grant is a configured grant for the MAC entity's AUL C-RNTI and if the corresponding PUSCH transmission has been performed in this subframe:
    if mpdcch-UL-HARQ-ACK-FeedbackConfig is not configured; or
    if mpdcch-UL-HARQ-ACK-FeedbackConfig is configured and an UL HARQ-ACK feedback has not been received on PDCCH until the last repetition of the corresponding PUSCH transmission
    start the UL HARQ RTT Timer for the corresponding HARQ process in the subframe containing the last repetition of the corresponding PUSCH transmission;
    stop the drx-ULRetransmissionTimer or drx-ULRetransmissionTimerShortTTI for the corresponding HARQ process;
    if NB-IoT, stop drx-RetransmissionTimer for all DL HARQ processes.
if the PDCCH indicates a new transmission (DL, UL or SL):
    except for an NB-IoT UE configured with a single DL and UL HARQ process, start or restart drx-InactivityTimer.
if the PDCCH indicates a transmission (DL, UL) for an NB-IoT UE:
    if the NB-IoT UE is configured with a single DL and UL HARQ process:
    stop drx-InactivityTimer.
    stop onDurationTimer.
if the PDCCH indicates an UL HARQ-ACK feedback for an asynchronous UL HARQ process for a UE configured with mpdcch-UL-HARQ-ACK-FeedbackConfig; and
if the PUSCH transmission is completed:
    stop drx-ULRetransmissionTimer for all UL HARQ processes.
if the PDCCH indicates HARQ feedback for one or more HARQ processes for which UL HARQ operation is autonomous:
    stop the drx-ULRetransmissionTimer for the corresponding HARQ process(es).
in current subframe n, if the MAC entity would not be in Active Time considering grants/assignments/DRX Command MAC control elements/Long DRX Command MAC control elements received and Scheduling Request sent until and including subframe n-5 when evaluating all DRX Active Time conditions as specified in this subclause, type-0-triggered SRS [2] shall not be reported.
if CQI masking (cqi-Mask) is setup by upper layers:
    in current TTI n, if onDurationTimer would not be running considering grants/assignments/DRX Command MAC control elements/Long DRX Command MAC control elements received until and including TTI n-5 when evaluating all DRX Active Time conditions as specified in this subclause, CQI/PMI/RI/PTI/CRI on PUCCH shall not be reported.
else:
    in current TTI n, if the MAC entity would not be in Active Time considering grants/assignments/DRX Command MAC control elements/Long DRX Command MAC control elements received and Scheduling Request sent until and including TTI n-5 when evaluating all DRX Active Time conditions as specified in this subclause, CQI/PMI/RI/PTI/CRI on PUCCH shall not be reported.

Regardless of whether the MAC entity is monitoring PDCCH or not, the MAC entity receives and transmits HARQ feedback and transmits type-1-triggered SRS [2] when such is expected. The MAC entity monitors PDCCH addressed to CC-RNTI for a PUSCH trigger B [2] on the corresponding SCell even if the MAC entity is not in Active Time. when such is expected.

When the BL UE or the UE in enhanced coverage or NB-IoT UE receives PDCCH, the UE executes the corresponding action specified in this subclause in the subframe following the subframe containing the last repetition of the PDCCH reception where such subframe is determined by the starting subframe and the DCI subframe repetition number field in the PDCCH specified in TS36.213 [2], unless explicitly stated otherwise.

NOTE 1: The same Active Time applies to all activated serving cell(s).
    NOTE 2: In case of downlink spatial multiplexing, if a TB is received while the HARQ RTT Timer is running and the previous transmission of the same TB was received at least N subframes before the current subframe (where N corresponds to the HARQ RTT Timer), the MAC entity should process it and restart the HARQ RTT Timer.
    NOTE 3: The MAC entity does not consider PUSCH trigger B [2] to be an indication of a new transmission.
    NOTE 4: For NB-IoT, for operation in FDD mode, and for operation in TDD mode with a single HARQ process, DL and UL transmissions will not be scheduled in parallel, i.e. if a DL transmission has been scheduled an UL transmission will not be scheduled until HARQ RTT Timer of the DL HARQ process has expired (and vice versa).

[ . . . ]

5.14 SL-SCH Data Transfer
5.14.1 SL-SCH Data Transmission
5.14.1.1 SL Grant Reception and SCI Transmission In order to transmit on the SL-SCH the MAC entity must have at least one sidelink grant.

Sidelink grants are selected as follows for sidelink communication:
    if the MAC entity is configured to receive a single sidelink grant dynamically on the PDCCH and more data is available in STCH than can be transmitted in the current SC period, the MAC entity shall:
    using the received sidelink grant determine the set of subframes in which transmission of SCI and transmission of first transport block occur according to subclause 14.2.1 of [2];
    consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available;

clear the configured sidelink grant at the end of the corresponding SC Period;

else, if the MAC entity is configured by upper layers to receive multiple sidelink grants dynamically on the PDCCH and more data is available in STCH than can be transmitted in the current SC period, the MAC entity shall for each received sidelink grant:

using the received sidelink grant determine the set of subframes in which transmission of SCI and transmission of first transport block occur according to subclause 14.2.1 of [2];

consider the received sidelink grant to be a configured sidelink grant occurring in those subframes starting at the beginning of the first available SC Period which starts at least 4 subframes after the subframe in which the sidelink grant was received, overwriting a previously configured sidelink grant received in the same subframe number but in a different radio frame as this configured sidelink grant occurring in the same SC period, if available;

clear the configured sidelink grant at the end of the corresponding SC Period;

else, if the MAC entity is configured by upper layers to transmit using one or multiple pool(s) of resources as indicated in subclause 5.10.4 of [8] and more data is available in STCH than can be transmitted in the current SC period, the MAC entity shall for each sidelink grant to be selected:

if configured by upper layers to use a single pool of resources:

select that pool of resources for use;

else, if configured by upper layers to use multiple pools of resources:

select a pool of resources for use from the pools of resources configured by upper layers whose associated priority list includes the priority of the highest priority of the sidelink logical channel in the MAC PDU to be transmitted;

NOTE: If more than one pool of resources has an associated priority list which includes the priority of the sidelink logical channel with the highest priority in the MAC PDU to be transmitted, it is left for UE implementation which one of those pools of resources to select.

randomly select the time and frequency resources for SL-SCH and SCI of a sidelink grant from the selected resource pool. The random function shall be such that each of the allowed selections [2] can be chosen with equal probability;

use the selected sidelink grant to determine the set of subframes in which transmission of SCI and transmission of first transport block occur according to subclause 14.2.1 of [2];

consider the selected sidelink grant to be a configured sidelink grant occurring in those subframes starting at the beginning of the first available SC Period which starts at least 4 subframes after the subframe in which the sidelink grant was selected;

clear the configured sidelink grant at the end of the corresponding SC Period;

NOTE: Retransmissions on SL-SCH cannot occur after the configured sidelink grant has been cleared.

NOTE: If the MAC entity is configured by upper layers to transmit using one or multiple pool(s) of resources as indicated in subclause 5.10.4 of [8], it is left for UE implementation how many sidelink grants to select within one SC period taking the number of sidelink processes into account.

Sidelink grants are selected as follows for V2X sidelink communication:

if the MAC entity is configured to receive a sidelink grant dynamically on the PDCCH and data is available in STCH, the MAC entity shall:

use the received sidelink grant to determine the number of HARQ retransmissions and the set of subframes in which transmission of SCI and SL-SCH occur according to subclause 14.2.1 and 14.1.1.4A of [2];

consider the received sidelink grant to be a configured sidelink grant;

if the MAC entity is configured by upper layers to receive a sidelink grant on the PDCCH addressed to SL Semi-Persistent Scheduling V-RNTI, the MAC entity shall for each SL SPS configuration:

if PDCCH contents indicate SPS activation:

use the received sidelink grant to determine the number of HARQ retransmissions and the set of subframes in which transmission of SCI and SL-SCH occur according to subclause 14.2.1 and 14.1.1.4A of [2];

consider the received sidelink grant to be a configured sidelink grant;

if PDCCH contents indicate SPS release:

clear the corresponding configured sidelink grant;

if the MAC entity is configured by upper layers to transmit using pool(s) of resources in one or multiple carriers as indicated in subclause 5.10.13.1 of [8] based on sensing, or partial sensing, or random selection only if upper layers indicates that transmissions of multiple MAC PDUs are allowed according to subclause 5.10.13.1a of [8], and the MAC entity selects to create a configured sidelink grant corresponding to transmissions of multiple MAC PDUs, and data is available in STCH associated with one or multiple carriers, the MAC entity shall for each Sidelink process configured for multiple transmissions on a selected carrier according to subclause 5.14.1.5:

if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or if neither transmission nor retransmission has been performed by the MAC entity on any resource indicated in the configured sidelink grant during the last second; or if sl-ReselectAfter is configured and the number of consecutive unused transmission opportunities on resources indicated in the configured sidelink grant is equal to sl-ReselectAfter; or if there is no configured sidelink grant; or if the configured sidelink grant cannot accommodate a RLC SDU by using the maximum allowed MCS configured by upper layers in maxMCS-PSSCH and the MAC entity selects not to segment the RLC SDU; or NOTE: If the configured sidelink grant cannot accommodate the RLC SDU, it is left for UE implementation whether to perform segmentation or sidelink resource reselection.

if transmission(s) with the configured sidelink grant cannot fulfil the latency requirement of the data in a sidelink logical channel according to the associated PPPP, and the MAC entity selects not to perform transmission(s) corresponding to a single MAC PDU; or NOTE: If the latency requirement is not met, it is left for UE implementation whether to perform transmission(s) corresponding to single MAC PDU or sidelink resource reselection.

if a pool of resources is configured or reconfigured by upper layers for the selected carrier:
clear the configured sidelink grant, if available;
trigger the TX carrier (re-)selection procedure as specified in sub-clause 5.14.1.5;

if the carrier is (re-)selected in the Tx carrier (re-)selection according to sub-clause 5.14.1.5, the following is performed on the selected carrier:
select one of the allowed values configured by upper layers in restrictResourceReservationPeriod and set the resource reservation interval by multiplying 100 with the selected value;

NOTE: How the UE selects this value is up to UE implementation.

randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;

select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;

if transmission based on random selection is configured by upper layers:
randomly select the time and frequency resources for one transmission opportunity from the resource pool, according to the amount of selected frequency resources. The random function shall be such that each of the allowed selections can be chosen with equal probability;

else:
randomly select the time and frequency resources for one transmission opportunity from the resources indicated by the physical layer according to sub-clause 14.1.1.6 of [2], according to the amount of selected frequency resources. The random function shall be such that each of the allowed selections can be chosen with equal probability;

use the randomly selected resource to select a set of periodic resources spaced by the resource reservation interval for transmission opportunities of SCI and SL-SCH corresponding to the number of transmission opportunities of MAC PDUs determined in subclause 14.1.1.4B of [2];

if the number of HARQ retransmissions is equal to 1 and there are available resources left in the resources indicated by the physical layer that meet the conditions in subclause 14.1.1.7 of [2] for more transmission opportunities:
randomly select the time and frequency resources for one transmission opportunity from the available resources, according to the amount of selected frequency resources. The random function shall be such that each of the allowed selections can be chosen with equal probability;

use the randomly selected resource to select a set of periodic resources spaced by the resource reservation interval for the other transmission opportunities of SCI and SL-SCH corresponding to the number of retransmission opportunities of the MAC PDUs determined in subclause 14.1.1.4B of [2];

consider the first set of transmission opportunities as the new transmission opportunities and the other set of transmission opportunities as the retransmission opportunities;

consider the set of new transmission opportunities and retransmission opportunities as the selected sidelink grant.

else:
consider the set as the selected sidelink grant;
use the selected sidelink grant to determine the set of subframes in which transmissions of SCI and SL-SCH occur according to subclause 14.2.1 and 14.1.1.4B of [2];
consider the selected sidelink grant to be a configured sidelink grant;

else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in probResourceKeep:
clear the configured sidelink grant, if available;
randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;
use the previously selected sidelink grant for the number of transmissions of the MAC PDUs determined in subclause 14.1.1.4B of [2] with the resource reservation interval to determine the set of subframes in which transmissions of SCI and SL-SCH occur according to subclause 14.2.1 and 14.1.1.4B of [2];

consider the selected sidelink grant to be a configured sidelink grant;

else, if the MAC entity is configured by upper layers to transmit using pool(s) of resources in one or multiple carriers as indicated in subclause 5.10.13.1 of [8], the MAC entity selects to create a configured sidelink grant corresponding to transmission(s) of a single MAC PDU, and data is available in STCH associated with one or multiple carriers, the MAC entity shall for a Sidelink process on a selected carrier according to subclause 5.14.1.5:

trigger the TX carrier (re-)selection procedure as specified in sub-clause 5.14.1.5;

if the carrier is (re-)selected in the Tx carrier (re-)selection according to sub-clause 5.14.1.5, the following is performed on the selected carrier:

select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;

select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;

if transmission based on random selection is configured by upper layers:

randomly select the time and frequency resources for one transmission opportunity of SCI and SL-SCH from the resource pool, according to the amount of selected frequency resources. The random function shall be such that each of the allowed selections can be chosen with equal probability;

else:

randomly select the time and frequency resources for one transmission opportunity of SCI and SL-SCH from the resources indicated by the physical layer according to subclause 14.1.1.6 of [2], according to the amount of selected frequency resources. The random function shall be such that each of the allowed selections can be chosen with equal probability;

if the number of HARQ retransmissions is equal to 1:

if transmission based on random selection is configured by upper layers and there are available resources that meet the conditions in subclause 14.1.1.7 of [2] for one more transmission opportunity:

randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;

else, if transmission based on sensing or partial sensing is configured by upper layers and there are available resources left in the resources indicated by the physical layer that meet the conditions in subclause 14.1.1.7 of [2] for one more transmission opportunity:

randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;

consider a transmission opportunity which comes first in time as the new transmission opportunity and a transmission opportunity which comes later in time as the retransmission opportunity;

consider both of the transmission opportunities as the selected sidelink grant;

else:

consider the transmission opportunity as the selected sidelink grant;

use the selected sidelink grant to determine the subframes in which transmission(s) of SCI and SL-SCH occur according to subclause 14.2.1 and 14.1.1.4B of [2];

consider the selected sidelink grant to be a configured sidelink grant.

NOTE: For V2X sidelink communication, the UE should ensure the randomly selected time and frequency resources fulfill the latency requirement.

NOTE: For V2X sidelink communication, when there is no overlapping between the chosen configuration(s) in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.

The MAC entity shall for each subframe:

if the MAC entity has a configured sidelink grant occurring in this subframe:

if SL_RESOURCE_RESELECTION_COUNTER=1 and the MAC entity randomly selected, with equal probability, a value in the interval [0, 1] which is above the probability configured by upper layers in probResourceKeep:
set the resource reservation interval equal to 0;
if the configured sidelink grant corresponds to transmission of SCI:
for V2X sidelink communication in UE autonomous resource selection:
select a MCS which is, if configured, within the range that is configured by upper layers between minMCS-PSSCH and maxMCS-PSSCH included in pssch-TxConfigList and, if configured by upper layers, overlapped between minMCS-PSSCH and maxMCS-PSSCH indicated in cbr-pssch-TxConfigList for the highest priority of the sidelink logical channel(s) in the MAC PDU and the CBR measured by lower layers according to [6] if CBR measurement results are available or the corresponding defaultTxConfigIndex configured by upper layers if CBR measurement results are not available;
NOTE: MCS selection is up to UE implementation if the MCS or the corresponding range is not configured by upper layers.
NOTE: For V2X sidelink communication, when there is no overlapping between the chosen configuration(s) included in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.
for V2X sidelink communication in scheduled resource allocation:
select a MCS unless it is configured by upper layer;
instruct the physical layer to transmit SCI corresponding to the configured sidelink grant;
for V2X sidelink communication, deliver the configured sidelink grant, the associated HARQ information and the value of the highest priority of the sidelink logical channel(s) in the MAC PDU to the Sidelink HARQ Entity for this subframe;
else if the configured sidelink grant corresponds to transmission of first transport block for sidelink communication:
deliver the configured sidelink grant and the associated HARQ information to the Sidelink HARQ Entity for this subframe.
NOTE: If the MAC entity has multiple configured grants occurring in one subframe and if not all of them can be processed due to the single-cluster SC-FDM restriction, it is left for UE implementation which one of these to process according to the procedure above.

5.14.1.2 Sidelink HARQ Operation
5.14.1.2.1 Sidelink HARQ Entity
The MAC entity is configured by upper layers to transmit using pool(s) of resources on one or multiple carriers as indicated in subclause 5.10.13.1 of 3GPP TS 36.331 [8], there is one Sidelink HARQ Entity at the MAC entity for each carrier for transmission on SL-SCH, which maintains a number of parallel Sidelink processes.

For sidelink communication, the number of transmitting Sidelink processes associated with the Sidelink HARQ Entity is defined in [8].
For V2X sidelink communication, the maximum number of transmitting Sidelink processes associated with each Sidelink HARQ Entity is 8. A sidelink process may be configured for transmissions of multiple MAC PDUs. For transmissions of multiple MAC PDUs, the maximum number of transmitting Sidelink processes associated with each Sidelink HARQ Entity is 2.
A delivered and configured sidelink grant and its associated HARQ information are associated with a Sidelink process. For each subframe of the SL-SCH and each Sidelink process, the Sidelink HARQ Entity shall:
if a sidelink grant corresponding to a new transmission opportunity has been indicated for this Sidelink process and there is SL data, for sidelink logical channels of ProSe destination associated with this sidelink grant, available for transmission:
obtain the MAC PDU from the "Multiplexing and assembly" entity;
deliver the MAC PDU and the sidelink grant and the HARQ information to this Sidelink process;
instruct this Sidelink process to trigger a new transmission.
else, if this subframe corresponds to retransmission opportunity for this Sidelink process:
instruct this Sidelink process to trigger a retransmission.
NOTE: The resources for retransmission opportunities are specified in subclause 14.2.1 of [2] unless specified in subclause 5.14.1.1.

5.14.1.2.2 Sidelink Process
The Sidelink process is associated with a HARQ buffer. The sequence of redundancy versions is 0, 2, 3, 1. The variable CURRENT_IRV is an index into the sequence of redundancy versions. This variable is updated modulo 4.
New transmissions and retransmissions either for a given SC period in sidelink communication or in V2X sidelink communication are performed on the resource indicated in the sidelink grant as specified in subclause 5.14.1.1 and with the MCS selected as specified in subclause 5.14.1.1.
If the sidelink process is configured to perform transmissions of multiple MAC PDUs for V2X sidelink communication the process maintains a counter SL_RESOURCE_RESELECTION_COUNTER. For other configurations of the sidelink process, this counter is not available.
If the Sidelink HARQ Entity requests a new transmission, the Sidelink process shall:
set CURRENT_IRV to 0;
store the MAC PDU in the associated HARQ buffer;
store the sidelink grant received from the Sidelink HARQ Entity;
generate a transmission as described below.
If the Sidelink HARQ Entity requests a retransmission, the Sidelink process shall:
generate a transmission as described below.
To generate a transmission, the Sidelink process shall:
if there is no uplink transmission; or if the MAC entity is able to perform uplink transmissions and transmissions on SL-SCH simultaneously at the time of the transmission; or if there is a MAC PDU to be transmitted in this TTI in uplink, except a MAC PDU obtained from the Msg3 buffer and transmission of V2X sidelink communication is prioritized over uplink transmission; and if there is no Sidelink Discovery Gap for Transmission or no transmission on PSDCH at the time of the transmission; or, in case of transmissions of V2X sidelink communication, if the MAC entity is able to perform transmissions on SL-SCH and transmissions on PSDCH simultaneously at the time of the transmission:
  instruct the physical layer to generate a transmission according to the stored sidelink grant with the redundancy version corresponding to the CURRENT_IRV value.
increment CURRENT_IRV by 1;
if this transmission corresponds to the last transmission of the MAC PDU:
  decrement SL_RESOURCE_RESELECTION_COUNTER by 1, if available.

The transmission of V2X sidelink communication is prioritized over uplink transmission if the following conditions are met:
  if the MAC entity is not able to perform uplink transmissions and transmissions of V2X sidelink communication simultaneously at the time of the transmission; and
  if uplink transmission is not prioritized by upper layer according to [15]; and
  if the value of the highest priority of the sidelink logical channel(s) in the MAC PDU is lower than thresSL-TxPrioritization if thresSL-TxPrioritization is configured.

5.14.1.3 Multiplexing and Assembly

For PDU(s) associated with one SCI, MAC shall consider only logical channels with the same Source Layer-2 ID-Destination Layer-2 ID pair.

Multiple transmissions within overlapping SC periods to different ProSe Destinations are allowed subject to single-cluster SC-FDM constraint.

In V2X sidelink communication, multiple transmissions for different Sidelink processes are allowed to be independently performed in different subframes.

5.14.1.3.1 Logical Channel Prioritization

The Logical Channel Prioritization procedure is applied when a new transmission is performed. Each sidelink logical channel has an associated priority which is the PPPP and optionally an associated PPPR. Multiple sidelink logical channels may have the same associated priority. The mapping between priority and LCID is left for UE implementation. If duplication is activated as specified in 3GPP TS 36.323 [4], the MAC entity shall map different sidelink logical channels which correspond to the same PDCP entity in duplication onto different carriers in accordance with 5.14.1.5 or onto different carriers of different carrier set, if configured by upper layer (3GPP TS 36.331 [8]), based on UE implementation.

The MAC entity shall perform the following Logical Channel Prioritization procedure either for each SCI transmitted in an SC period in sidelink communication, or for each SCI corresponding to a new transmission in V2X sidelink communication:
  The MAC entity shall allocate resources to the sidelink logical channels in the following steps:
    Only consider sidelink logical channels not previously selected for this SC period and the SC periods (if any) which are overlapping with this SC period, to have data available for transmission in sidelink communication;
    Only consider sidelink logical channels which meet the following conditions:
      allowed on the carrier where the SCI is transmitted for V2X sidelink communication, if the carrier is configured by upper layers according to 3GPP TS 36.331 [8] and 3GPP TS 24.386 [15];
      having a priority whose associated threshCBR-FreqReselection is no lower than the CBR of the carrier when the carrier is (re-)selected in accordance with 5.14.1.5;
    Exclude sidelink logical channel(s) not allowed on the carrier where the SCI is transmitted, if duplication is activated as specified in 3GPP TS 36.323 [4].
    Step 0: Select a ProSe Destination, having the sidelink logical channel with the highest priority, among the sidelink logical channels having data available for transmission and having the same transmission format as the one selected corresponding to the ProSe Destination;
      NOTE: The sidelink logical channels belonging to the same ProSe Destination have the same transmission format.
  For each MAC PDU associated to the SCI:
    Step 1: Among the sidelink logical channels belonging to the selected ProSe Destination and having data available for transmission, allocate resources to the sidelink logical channel with the highest priority;
    Step 2: if any resources remain, sidelink logical channels belonging to the selected ProSe Destination are served in decreasing order of priority until either the data for the sidelink logical channel(s) or the SL grant is exhausted, whichever comes first. Sidelink logical channels configured with equal priority should be served equally.
  The UE shall also follow the rules below during the scheduling procedures above:
    the UE should not segment an RLC SDU (or partially transmitted SDU) if the whole SDU (or partially transmitted SDU) fits into the remaining resources;
    if the UE segments an RLC SDU from the sidelink logical channel, it shall maximize the size of the segment to fill the grant as much as possible;
    the UE should maximise the transmission of data;
    if the MAC entity is given a sidelink grant size that is equal to or larger than 10 bytes (for sidelink communication) or 11 bytes (for V2X sidelink communication) while having data available for transmission, the MAC entity shall not transmit only padding.

5.14.1.3.2 Multiplexing of MAC SDUs

The MAC entity shall multiplex MAC SDUs in a MAC PDU according to subclauses 5.14.1.3.1 and 6.1.6.

5.14.1.4 Buffer Status Reporting

The sidelink Buffer Status reporting procedure is used to provide the serving eNB with information about the amount of sidelink data available for transmission in the SL buffers associated with the MAC entity. RRC controls BSR reporting for the sidelink by configuring the two timers periodic-BSR-TimerSL and retx-BSR-TimerSL. Each sidelink logical channel belongs to a ProSe Destination. Each sidelink logical channel is allocated to an LCG depending on the priority and optionally the PPPR of the sidelink logical channel, and the mapping between LCG ID and priority and optionally the mapping between LCG ID and PPPR which are provided by upper layers in logicalChGroupInfoList [8]. LCG is defined per ProSe Destination.

A sidelink Buffer Status Report (BSR) shall be triggered if any of the following events occur:
  if the MAC entity has a configured SL-RNTI or a configured SL-V-RNTI:
    SL data, for a sidelink logical channel of a ProSe Destination, becomes available for transmission in the RLC entity or in the PDCP entity (the definition of what data shall be considered as available for transmission is specified in [3] and [4] respectively) and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the Sidelink BSR is referred below to as "Regular Sidelink BSR";

UL resources are allocated and number of padding bits remaining after a Padding BSR has been triggered is equal to or larger than the size of the Sidelink BSR MAC control element containing the buffer status for at least one LCG of a ProSe Destination plus its subheader, in which case the Sidelink BSR is referred below to as "Padding Sidelink BSR";

retx-BSR-TimerSL expires and the MAC entity has data available for transmission for any of the sidelink logical channels, in which case the Sidelink BSR is referred below to as "Regular Sidelink BSR";

periodic-BSR-TimerSL expires, in which case the Sidelink BSR is referred below to as "Periodic Sidelink BSR";

else:

An SL-RNTI or an SL-V-RNTI is configured by upper layers and SL data is available for transmission in the RLC entity or in the PDCP entity (the definition of what data shall be considered as available for transmission is specified in [3] and [4] respectively), in which case the Sidelink BSR is referred below to as "Regular Sidelink BSR".

For Regular and Periodic Sidelink BSR:

if the number of bits in the UL grant is equal to or larger than the size of a Sidelink BSR containing buffer status for all LCGs having data available for transmission plus its subheader:

report Sidelink BSR containing buffer status for all LCGs having data available for transmission;

else report Truncated Sidelink BSR containing buffer status for as many LCGs having data available for transmission as possible, taking the number of bits in the UL grant into consideration.

For Padding Sidelink BSR:

if the number of padding bits remaining after a Padding BSR has been triggered is equal to or larger than the size of a Sidelink BSR containing buffer status for all LCGs having data available for transmission plus its subheader:

report Sidelink BSR containing buffer status for all LCGs having data available for transmission;

else report Truncated Sidelink BSR containing buffer status for as many LCGs having data available for transmission as possible, taking the number of bits in the UL grant into consideration.

If the Buffer Status reporting procedure determines that at least one Sidelink BSR has been triggered and not cancelled:

if the MAC entity has UL resources allocated for new transmission for this TTI and the allocated UL resources can accommodate a Sidelink BSR MAC control element plus its subheader as a result of logical channel prioritization:

instruct the Multiplexing and Assembly procedure to generate the Sidelink BSR MAC control element(s);

start or restart periodic-BSR-TimerSL except when all the generated Sidelink BSRs are Truncated Sidelink BSRs;

start or restart retx-BSR-TimerSL;

else if a Regular Sidelink BSR has been triggered:

if an uplink grant is not configured:

a Scheduling Request shall be triggered.

A MAC PDU shall contain at most one Sidelink BSR MAC control element, even when multiple events trigger a Sidelink BSR by the time a Sidelink BSR can be transmitted in which case the Regular Sidelink BSR and the Periodic Sidelink BSR shall have precedence over the padding Sidelink BSR.

The MAC entity shall restart retx-BSR-TimerSL upon reception of an SL grant.

All triggered regular Sidelink BSRs shall be cancelled in case the remaining configured SL grant(s) valid for this SC Period can accommodate all pending data available for transmission in sidelink communication or in case the remaining configured SL grant(s) valid can accommodate all pending data available for transmission in V2X sidelink communication. All triggered Sidelink BSRs shall be cancelled in case the MAC entity has no data available for transmission for any of the sidelink logical channels. All triggered Sidelink BSRs shall be cancelled when a Sidelink BSR (except for Truncated Sidelink BSR) is included in a MAC PDU for transmission. All triggered Sidelink BSRs shall be cancelled, and retx-BSR-TimerSL and periodic-BSR-TimerSL shall be stopped, when upper layers configure autonomous resource selection.

The MAC entity shall transmit at most one Regular/Periodic Sidelink BSR in a TTI. If the MAC entity is requested to transmit multiple MAC PDUs in a TTI, it may include a padding Sidelink BSR in any of the MAC PDUs which do not contain a Regular/Periodic Sidelink BSR.

All Sidelink BSRs transmitted in a TTI always reflect the buffer status after all MAC PDUs have been built for this TTI. Each LCG shall report at the most one buffer status value per TTI and this value shall be reported in all Sidelink BSRs reporting buffer status for this LCG.

NOTE: A Padding Sidelink BSR is not allowed to cancel a triggered Regular/Periodic Sidelink BSR. A Padding Sidelink BSR is triggered for a specific MAC PDU only and the trigger is cancelled when this MAC PDU has been built.

6.1.3.1a Sidelink BSR MAC Control Elements

Sidelink BSR and Truncated Sidelink BSR MAC control elements consist of one Destination Index field, one LCG ID field and one corresponding Buffer Size field per reported target group. The Sidelink BSR MAC control elements are identified by MAC PDU subheaders with LCIDs as specified in table 6.2.1-2. They have variable sizes.

For each included group, the fields are defined as follows (figures 6.1.3.1a-1 and 6.1.3.1a-2):

Destination Index: The Destination Index field identifies the ProSe Destination or the destination for V2X sidelink communication. The length of this field is 4 bits. The value is set to the index of the destination reported in destinationInfoList for sidelink communication or is set to one index among index(es) associated to same destination reported in v2x-DestinationInfoList for V2X sidelink communication. If multiple such lists are reported, the value is indexed sequentially across all the lists in the same order as specified in [8];

LCG ID: The Logical Channel Group ID field identifies the group of logical channel(s) which buffer status is being reported. The length of the field is 2 bits;

Buffer Size: The Buffer Size field identifies the total amount of data available across all logical channels of a LCG of a ProSe Destination after all MAC PDUs for the TTI have been built. The amount of data is indicated in number of bytes. It shall include all data that is available for transmission in the RLC layer and in the PDCP layer; the definition of what data shall be considered as available for transmission is specified in [3] and [4] respectively. The size of the RLC and MAC headers are not considered in the buffer size computation. The length of this field is 6 bits. The values taken by the Buffer Size field are shown in Table 6.1.3.1-1;

R: Reserved bit, set to "0".

Buffer Sizes of LCGs are included in decreasing order of the highest priority of the sidelink logical channel belonging to the LCG irrespective of the value of the Destination Index field.

FIG. 5 (a reproduction of Figure 6.1.3.1a-1: Sidelink BSR and Truncated Sidelink BSR MAC control element for even N).

FIG. 6 (a reproduction of Figure 6.1.3.1a-2: Sidelink BSR and Truncated Sidelink BSR MAC control element for odd N).

[ . . . ]

6.1.6 MAC PDU (SL-SCH)

A MAC PDU consists of a MAC header, one or more MAC Service Data Units (MAC SDU), and optionally padding; as described in Figure 6.1.6-4.

Both the MAC header and the MAC SDUs are of variable sizes.

A MAC PDU header consists of one SL-SCH subheader, one or more MAC PDU subheaders; each subheader except SL-SCH subheader corresponds to either a MAC SDU or padding.

The SL-SCH subheader consists of the seven header fields V/R/R/R/R/SRC/DST.

A MAC PDU subheader consists of the six header fields R/R/E/LCID/F/L but for the last subheader in the MAC PDU. The last subheader in the MAC PDU consists solely of the four header fields R/R/E/LCID. A MAC PDU subheader corresponding to padding consists of the four header fields R/R/E/LCID.

Figure 7:
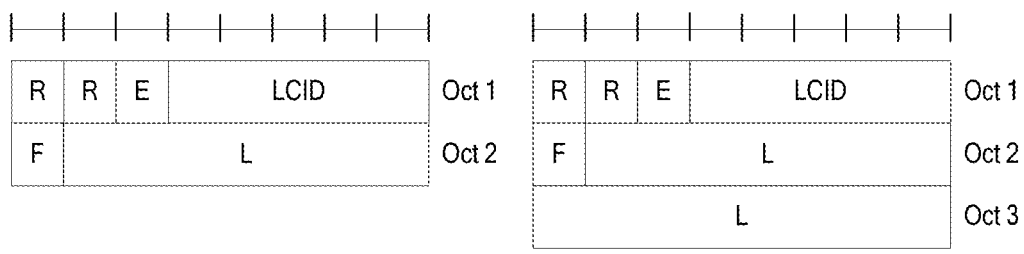
FIG. 7 is a reproduction of Figure 6.1.6-1 showing R/R/E/LCID/F/L MAC subheader taken from 3GPP TS 36.321-f30.

FIG. 7 (a reproduction of Figure 6.1.6-1: R/R/E/LCID/F/L MAC subheader).

Figure 8:
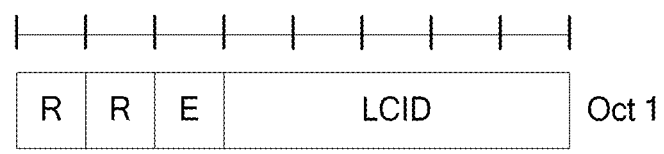
FIG. 8 is a reproduction of Figure 6.1.6-2 showing R/R/E/LCID MAC subheader taken from 3GPP TS 36.321-f30.

FIG. 8 (a reproduction of Figure 6.1.6-2: R/R/E/LCID MAC subheader).

Figure 9:
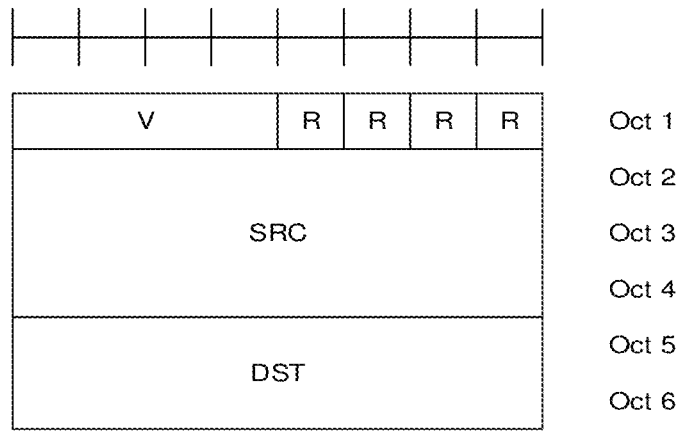
FIG. 9 is a reproduction of Figure 6.1.6-3 showing SL-SCH MAC subheader for V="0001" and "0010" taken from 3GPP TS 36.321-f30.

FIG. 9 (a reproduction of Figure 6.1.6-3: SL-SCH MAC subheader for V="0001" and "0010").

Figure 10:
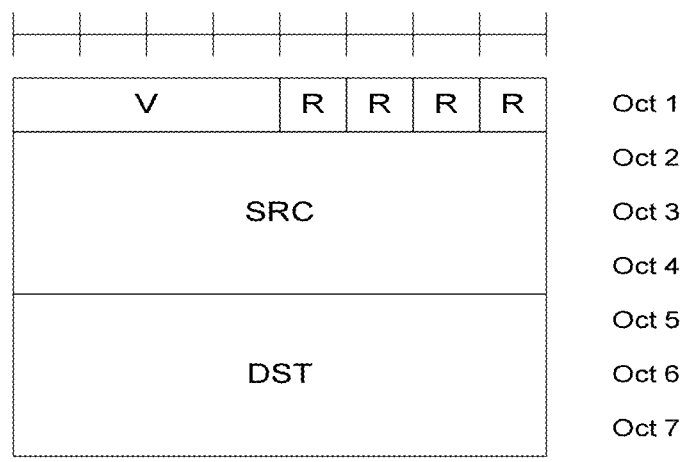
FIG. 10 is a reproduction of Figure 6.1.6-3a showing SL-SCH MAC subheader for V="0011" taken from 3GPP TS 36.321-f30.

FIG. 10 (a reproduction of Figure 6.1.6-3a: SL-SCH MAC subheader for V="0011").

MAC PDU subheaders have the same order as the corresponding MAC SDUs and padding.

Padding occurs at the end of the MAC PDU, except when single-byte or two-byte padding is required. Padding may have any value and the MAC entity shall ignore it. When padding is performed at the end of the MAC PDU, zero or more padding bytes are allowed.

When single-byte or two-byte padding is required, one or two MAC PDU subheaders corresponding to padding are placed after the SL-SCH subheader and before any other MAC PDU subheader.

A maximum of one MAC PDU can be transmitted per TB.

Figure 11:
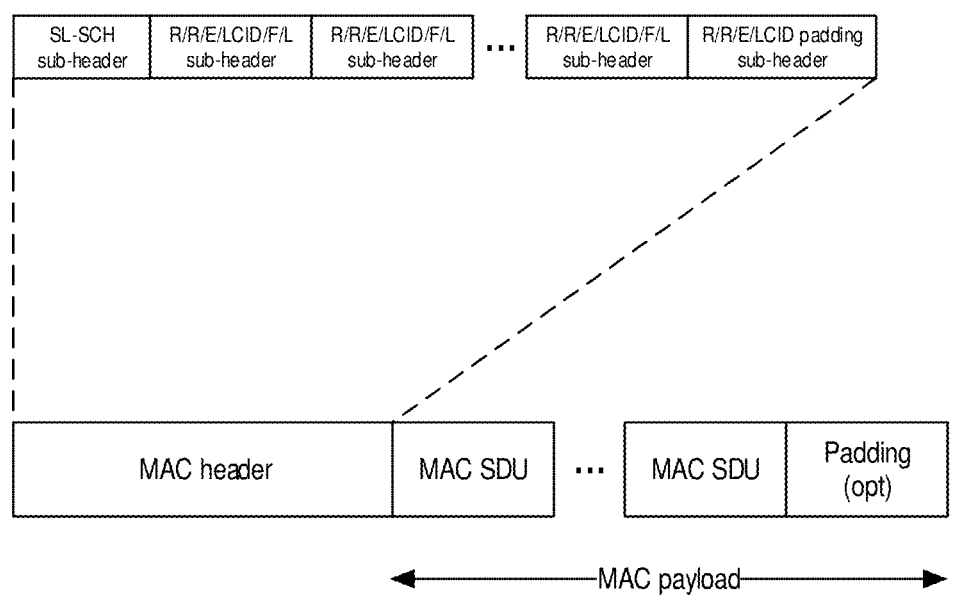
FIG. 11 is a reproduction of Figure 6.1.6-4 showing an "Example of MAC PDU consisting of MAC header, MAC SDUs and padding" taken from 3GPP TS 36.321-f30.

FIG. 11 (a reproduction of Figure 6.1.6-4: Example of MAC PDU consisting of MAC header, MAC SDUs and padding).

In 3GPP TS 38.321-f40, Scheduling Request (SR), Buffer Status Reporting (BSR), and Discontinuous Reception (DRX) mechanism in New Radio (NR) is quoted below:

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the logical channel that triggered the BSR (subclause 5.4.5) (if such a configuration exists) is considered as corresponding SR configuration for the triggered SR.

RRC configures the following parameters for the scheduling request procedure:

sr-ProhibitTimer (per SR configuration);
sr-TransMax (per SR configuration).

The following UE variables are used for the scheduling request procedure:

SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled. All pending SR(s) triggered prior to the MAC PDU assembly shall be cancelled and each respective sr-ProhibitTimer shall be stopped when the MAC PDU is transmitted and this PDU includes a Long or Short BSR MAC CE which contains buffer status up to (and including) the last event that triggered a BSR (see subclause 5.4.5) prior to the MAC PDU assembly. All pending SR(s) shall be cancelled and each respective sr-ProhibitTimer shall be stopped when the UL grant(s) can accommodate all pending data available for transmission.

Only PUCCH resources on a BWP which is active at the time of SR transmission occasion are considered valid.

As long as at least one SR is pending, the MAC entity shall for each pending SR:

1> if the MAC entity has no valid PUCCH resource configured for the pending SR:
2> initiate a Random Access procedure (see subclause 5.1) on the SpCell and cancel the pending SR.
1> else, for the SR configuration corresponding to the pending SR:
2> when the MAC entity has an SR transmission occasion on the valid PUCCH resource for SR configured; and
2> if sr-ProhibitTimer is not running at the time of the SR transmission occasion; and
2> if the PUCCH resource for the SR transmission occasion does not overlap with a measurement gap; and
2> if the PUCCH resource for the SR transmission occasion does not overlap with a UL-SCH resource:
3> if SR_COUNTER < sr-TransMax:
4> increment SR_COUNTER by 1;
4> instruct the physical layer to signal the SR on one valid PUCCH resource for SR;
4> start the sr-ProhibitTimer.
3> else:
4> notify RRC to release PUCCH for all Serving Cells;
4> notify RRC to release SRS for all Serving Cells;

4> clear any configured downlink assignments and uplink grants;
4> clear any PUSCH resources for semi-persistent CSI reporting;
4> initiate a Random Access procedure (see subclause 5.1) on the SpCell and cancel all pending SRs.

NOTE 1: The selection of which valid PUCCH resource for SR to signal SR on when the MAC entity has more than one overlapping valid PUCCH resource for the SR transmission occasion is left to UE implementation.

NOTE 2: If more than one individual SR triggers an instruction from the MAC entity to the PHY layer to signal the SR on the same valid PUCCH resource, the SR_COUNTER for the relevant SR configuration is incremented only once.

The MAC entity may stop, if any, ongoing Random Access procedure due to a pending SR which has no valid PUCCH resources configured, which was initiated by MAC entity prior to the MAC PDU assembly. Such a Random Access procedure may be stopped when the MAC PDU is transmitted using a UL grant other than a UL grant provided by Random Access Response, and this PDU includes a BSR MAC CE which contains buffer status up to (and including) the last event that triggered a BSR (see subclause 5.4.5) prior to the MAC PDU assembly, or when the UL grant(s) can accommodate all pending data available for transmission.

5.4.5 Buffer Status Reporting

The Buffer Status reporting (BSR) procedure is used to provide the serving gNB with information about UL data volume in the MAC entity.

RRC configures the following parameters to control the BSR:
periodicBSR-Timer;
retxBSR-Timer;
logicalChannelSR-DelayTimerApplied;
logicalChannelSR-DelayTimer;
logicalChannelSR-Mask;
logicalChannelGroup.

Each logical channel may be allocated to an LCG using the logicalChannelGroup. The maximum number of LCGs is eight.

The MAC entity determines the amount of UL data available for a logical channel according to the data volume calculation procedure in TSs 38.322 [3] and 38.323 [4].

A BSR shall be triggered if any of the following events occur:
UL data, for a logical channel which belongs to an LCG, becomes available to the MAC entity; and either
this UL data belongs to a logical channel with higher priority than the priority of any logical channel containing available UL data which belong to any LCG; or
none of the logical channels which belong to an LCG contains any available UL data.
in which case the BSR is referred below to as 'Regular BSR';
UL resources are allocated and number of padding bits is equal to or larger than the size of the Buffer Status Report MAC CE plus its subheader, in which case the BSR is referred below to as 'Padding BSR';
retxBSR-Timer expires, and at least one of the logical channels which belong to an LCG contains UL data, in which case the BSR is referred below to as 'Regular BSR';
periodicBSR-Timer expires, in which case the BSR is referred below to as 'Periodic BSR'.

NOTE: When Regular BSR triggering events occur for multiple logical channels simultaneously, each logical channel triggers one separate Regular BSR.

For Regular BSR, the MAC entity shall:
1> if the BSR is triggered for a logical channel for which logicalChannelSR-DelayTimerApplied is configured by upper layers:
2> start or restart the logicalChannelSR-DelayTimer.
1> else:
2> if running, stop the logicalChannelSR-DelayTimer.

For Regular and Periodic BSR, the MAC entity shall:
1> if more than one LCG has data available for transmission when the MAC PDU containing the BSR is to be built:
2> report Long BSR for all LCGs which have data available for transmission.
1> else:
2> report Short BSR.

For Padding BSR:
1> if the number of padding bits is equal to or larger than the size of the Short BSR plus its subheader but smaller than the size of the Long BSR plus its subheader:
2> if more than one LCG has data available for transmission when the BSR is to be built:
3> if the number of padding bits is equal to the size of the Short BSR plus its subheader:
4> report Short Truncated BSR of the LCG with the highest priority logical channel with data available for transmission.
3> else:
4> report Long Truncated BSR of the LCG(s) with the logical channels having data available for transmission following a decreasing order of the highest priority logical channel (with or without data available for transmission) in each of these LCG(s), and in case of equal priority, in increasing order of LCGID.
2> else:
3> report Short BSR.
1> else if the number of padding bits is equal to or larger than the size of the Long BSR plus its subheader:
2> report Long BSR for all LCGs which have data available for transmission.

For BSR triggered by retxBSR-Timer expiry, the MAC entity considers that the logical channel that triggered the BSR is the highest priority logical channel that has data available for transmission at the time the BSR is triggered.

The MAC entity shall:
1> if the Buffer Status reporting procedure determines that at least one BSR has been triggered and not cancelled:
2> if UL-SCH resources are available for a new transmission and the UL-SCH resources can accommodate the BSR MAC CE plus its subheader as a result of logical channel prioritization:
3> instruct the Multiplexing and Assembly procedure to generate the BSR MAC CE(s);
3> start or restart periodicBSR-Timer except when all the generated BSRs are long or short Truncated BSRs;
3> start or restart retxBSR-Timer.

2> if a Regular BSR has been triggered and logical-ChannelSR-DelayTimer is not running:
  3> if there is no UL-SCH resource available for a new transmission; or
  3> if the MAC entity is configured with configured uplink grant(s) and the Regular BSR was triggered for a logical channel for which logicalChannelSR-Mask is set to false; or
  3> if the UL-SCH resources available for a new transmission do not meet the LCP mapping restrictions (see subclause 5.4.3.1) configured for the logical channel that triggered the BSR:
    4> trigger a Scheduling Request.

NOTE: UL-SCH resources are considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.

A MAC PDU shall contain at most one BSR MAC CE, even when multiple events have triggered a BSR. The Regular BSR and the Periodic BSR shall have precedence over the padding BSR.

The MAC entity shall restart retxBSR-Timer upon reception of a grant for transmission of new data on any UL-SCH.

All triggered BSRs may be cancelled when the UL grant(s) can accommodate all pending data available for transmission but is not sufficient to additionally accommodate the BSR MAC CE plus its subheader. All BSRs triggered prior to MAC PDU assembly shall be cancelled when a MAC PDU is transmitted and this PDU includes a Long or Short BSR MAC CE which contains buffer status up to (and including) the last event that triggered a BSR prior to the MAC PDU assembly.

NOTE: MAC PDU assembly can happen at any point in time between uplink grant reception and actual transmission of the corresponding MAC PDU. BSR and SR can be triggered after the assembly of a MAC PDU which contains a BSR MAC CE, but before the transmission of this MAC PDU. In addition, BSR and SR can be triggered during MAC PDU assembly.

[ . . . ]

5.7 Discontinuous Reception (DRX)

The MAC entity may be configured by RRC with a DRX functionality that controls the UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other subclauses of this specification. When in RRC_CONNECTED, if DRX is configured, for all the activated Serving Cells, the MAC entity may monitor the PDCCH discontinuously using the DRX operation specified in this subclause; otherwise the MAC entity shall monitor the PDCCH continuously.

RRC controls DRX operation by configuring the following parameters:
  drx-onDurationTimer: the duration at the beginning of a DRX Cycle;
  drx-SlotOffset: the delay before starting the drx-onDurationTimer;
  drx-InactivityTimer: the duration after the PDCCH occasion in which a PDCCH indicates a new UL or DL transmission for the MAC entity;
  drx-RetransmissionTimerDL (per DL HARQ process except for the broadcast process): the maximum duration until a DL retransmission is received;
  drx-RetransmissionTimerUL (per UL HARQ process): the maximum duration until a grant for UL retransmission is received;
  drx-LongCycleStartOffset: the Long DRX cycle and drx-StartOffset which defines the subframe where the Long and Short DRX Cycle starts;
  drx-ShortCycle (optional): the Short DRX cycle;
  drx-ShortCycleTimer (optional): the duration the UE shall follow the Short DRX cycle;
  drx-HARQ-RTT-TimerDL (per DL HARQ process except for the broadcast process): the minimum duration before a DL assignment for HARQ retransmission is expected by the MAC entity;
  drx-HARQ-RTT-TimerUL (per UL HARQ process): the minimum duration before a UL HARQ retransmission grant is expected by the MAC entity.

When a DRX cycle is configured, the Active Time includes the time while:
  drx-onDurationTimer or drx-InactivityTimer or drx-RetransmissionTimerDL or drx-RetransmissionTimerUL or ra-ContentionResolutionTimer (as described in subclause 5.1.5) is running; or
  a Scheduling Request is sent on PUCCH and is pending (as described in subclause 5.4.4); or
  a PDCCH indicating a new transmission addressed to the C-RNTI of the MAC entity has not been received after successful reception of a Random Access Response for the Random Access Preamble not selected by the MAC entity among the contention-based Random Access Preamble (as described in subclause 5.1.4).

When DRX is configured, the MAC entity shall:
  1> if a MAC PDU is received in a configured downlink assignment:
    2> start the drx-HARQ-RTT-TimerDL for the corresponding HARQ process in the first symbol after the end of the corresponding transmission carrying the DL HARQ feedback;
    2> stop the drx-RetransmissionTimerDL for the corresponding HARQ process.
  1> if a MAC PDU is transmitted in a configured uplink grant:
    2> start the drx-HARQ-RTT-TimerUL for the corresponding HARQ process in the first symbol after the end of the first repetition of the corresponding PUSCH transmission;
    2> stop the drx-RetransmissionTimerUL for the corresponding HARQ process.
  1> if a drx-HARQ-RTT-TimerDL expires:
    2> if the data of the corresponding HARQ process was not successfully decoded:
      3> start the drx-RetransmissionTimerDL for the corresponding HARQ process in the first symbol after the expiry of drx-HARQ-RTT-TimerDL.
  1> if a drx-HARQ-RTT-TimerUL expires:
    2> start the drx-RetransmissionTimerUL for the corresponding HARQ process in the first symbol after the expiry of drx-HARQ-RTT-TimerUL.
  1> if a DRX Command MAC CE or a Long DRX Command MAC CE is received:
    2> stop drx-onDurationTimer;
    2> stop drx-InactivityTimer.

1> if drx-InactivityTimer expires or a DRX Command MAC CE is received:
  2> if the Short DRX cycle is configured:
    3> start or restart drx-ShortCycleTimer in the first symbol after the expiry of drx-InactivityTimer or in the first symbol after the end of DRX Command MAC CE reception;
    3> use the Short DRX Cycle.
  2> else:
    3> use the Long DRX cycle.
1> if drx-ShortCycleTimer expires:
  2> use the Long DRX cycle.
1> if a Long DRX Command MAC CE is received:
  2> stop drx-ShortCycleTimer;
  2> use the Long DRX cycle.
1> if the Short DRX Cycle is used, and [(SFN×10)+ subframe number] modulo (drx-ShortCycle)=(drx-StartOffset) modulo (drx-ShortCycle); or
1> if the Long DRX Cycle is used, and [(SFN×10)+ subframe number] modulo (drx-LongCycle)=drx-StartOffset:
  2> start drx-onDurationTimer after drx-SlotOffset from the beginning of the subframe.
1> if the MAC entity is in Active Time:
  2> monitor the PDCCH;
  2> if the PDCCH indicates a DL transmission:
    3> start the drx-HARQ-RTT-TimerDL for the corresponding HARQ process in the first symbol after the end of the corresponding transmission carrying the DL HARQ feedback;
    3> stop the drx-RetransmissionTimerDL for the corresponding HARQ process.
  2> if the PDCCH indicates a UL transmission:
    3> start the drx-HARQ-RTT-TimerUL for the corresponding HARQ process in the first symbol after the end of the first repetition of the corresponding PUSCH transmission;
    3> stop the drx-RetransmissionTimerUL for the corresponding HARQ process.
  2> if the PDCCH indicates a new transmission (DL or UL):
    3> start or restart drx-InactivityTimer in the first symbol after the end of the PDCCH reception.
1> in current symbol n, if the MAC entity would not be in Active Time considering grants/assignments/DRX Command MAC CE/Long DRX Command MAC CE received and Scheduling Request sent 4 ms prior to symbol n when evaluating all DRX Active Time conditions as specified in this subclause:
  2> not transmit periodic SRS and semi-persistent SRS defined in TS 38.214 [7].
1> if CSI masking (csi-Mask) is setup by upper layers:
  2> in current symbol n, if onDurationTimer would not be running considering grants/assignments/DRX Command MAC CE/Long DRX Command MAC CE received 4 ms prior to symbol n when evaluating all DRX Active Time conditions as specified in this subclause:
    3> not report CSI on PUCCH.
1> else:
  2> in current symbol n, if the MAC entity would not be in Active Time considering grants/assignments/DRX Command MAC CE/Long DRX Command MAC CE received and Scheduling Request sent 4 ms prior to symbol n when evaluating all DRX Active Time conditions as specified in this subclause:
    3> not report CSI on PUCCH and semi-persistent CSI on PUSCH.

Regardless of whether the MAC entity is monitoring PDCCH or not, the MAC entity transmits HARQ feedback, aperiodic CSI on PUSCH, and aperiodic SRS defined in TS 38.214 [7] when such is expected.

The MAC entity needs not to monitor the PDCCH if it is not a complete PDCCH occasion (e.g. the Active Time starts or ends in the middle of a PDCCH occasion).

In RAN1#94 chairman's note, the agreements of NR Vehicle-to-Everything (V2X) are discussed and quoted below:

Agreements:
At least two sidelink resource allocation modes are defined for NR-V2X sidelink communication
  Mode 1: Base station schedules sidelink resource(s) to be used by UE for sidelink transmission(s)
  Mode 2: UE determines (i.e. base station does not schedule) sidelink transmission resource(s) within sidelink resources configured by base station/network or pre-configured sidelink resources
Notes:
  eNB control of NR sidelink and gNB control of LTE sidelink resources will be separately considered in corresponding agenda items.
  Mode-2 definition covers potential sidelink radio-layer functionality or resource allocation sub-modes (subject to further refinement including merging of some or all of them) where
  a) UE autonomously selects sidelink resource for transmission
  b) UE assists sidelink resource selection for other UE(s)
  c) UE is configured with NR configured grant (type-1 like) for sidelink transmission
  d) UE schedules sidelink transmissions of other UEs
RAN1 to continue study details of resource allocation modes for NR-V2X sidelink communication In RAN1#adohoc1901, the agreements for how a UE to request sidelink resource for retransmission are discussed and quoted below:

Agreements:
  It is supported that in mode 1 for unicast, the in-coverage UE sends an indication to gNB to indicate the need for retransmission
    At least PUCCH is used to report the information
      If feasible, RAN1 reuses PUCCH defined in Rel-15
    The gNB can also schedule re-transmission resource
    FFS transmitter UE and/or receiver UE
      If receiver UE, the indication is in the form of HARQ ACK/NAK
      If transmitter UE, FFS Some or all of the following terminology and assumption may be used hereafter.
  BS: a network central unit or a network node in NR which is used to control one or multiple TRPs which are associated with one or multiple cells. Communication between BS and TRP(s) is via fronthaul. BS may be referred to as central unit (CU), eNB, gNB, or NodeB.
  TRP: a transmission and reception point provides network coverage and directly communicates with UEs. TRP may be referred to as distributed unit (DU) or network node.
  Cell: a cell is composed of one or multiple associated TRPs, i.e. coverage of the cell is composed of coverage of all associated TRP(s). One cell is controlled by one BS. Cell may be referred to as TRP group (TRPG).

For network side:

Downlink timing of TRPs in the same cell are synchronized.

RRC layer of network side is in BS.

For UE side:

There are at least two UE (RRC) states: connected state (or called active state) and non-connected state (or called inactive state or idle state). Inactive state may be an additional state or belong to connected state or non-connected state.

Based on the current RAN1 design, a UE performing a sidelink unicast communication will support HARQ feedback in a sidelink interface. In other words, a Transmit (Tx) UE will monitor HARQ feedback from a Receive (Rx) UE after the Tx UE performed a sidelink transmission to the Rx UE. Based on the HARQ feedback result, the Tx UE may need to use the sidelink resource to perform a retransmission for the sidelink transmission to the Rx UE again through the sidelink interface.

Figure 12:
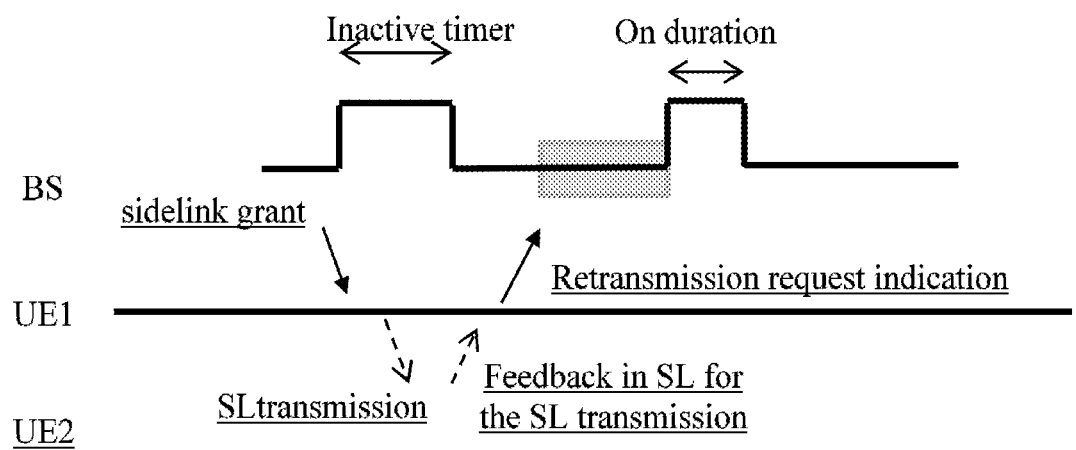
FIG. 12 illustrates an issue of NR V2X sidelink with DRX.

Currently, in the RAN1 discussion, the Tx UE (i.e., Mode 1 UE) may need to transmit an indication to the base station to indicate the need for retransmission. In the discussion, the indication could be one or more HARQ feedbacks for indicating whether a transmission of a sidelink grant is successful or unsuccessful. And it would be possible for a UE to receive another sidelink grant or a sidelink grant for retransmission for responding to such indication/HARQ feedback. Based on current New Radio (NR) Discontinuous Reception (DRX) design or LTE Vehicle-to-Everything (V2X) design, the UE may stay in a DRX period and will not receive any downlink control signaling from the Base Station (BS). In such case, the BS may need to wait until the next on-duration period to schedule the another Sidelink (SL) grant or the SL grant for retransmission as shown in FIG. 12. The gray area is the delay time that the UE will not monitor the downlink control channel (e.g., Physical Downlink Control Channel (PDCCH), coreset, and/or a PDCCH occasion).

Considering the possible DRX configuration, another SL grant or the SL grant for retransmission may not be able to satisfy the latency requirement of data included in the sidelink transmission. Although the BS could improve latency by configuring a short DRX period to the UE, the UE could suffer from a longer awaking time and increase unnecessary power consumption.

The following methods address this issue. As those skilled in the art will appreciate, one or more of the following methods may be applied at the same time.

According to one method, a new active time for monitoring a sidelink grant and/or a sidelink grant for retransmission after/in response to transmitting a feedback of the sidelink transmission to a BS for indicating the need for retransmission. In this method, the UE starts monitoring a sidelink grant and/or a sidelink grant for retransmission after/in response to the UE transmitting a feedback of a sidelink transmission. In one method, the BS configures whether the UE should start monitoring sidelink grants. In one method, the start timing of the monitoring period is configured by a BS (e.g., controlled by a timer or a counter). Alternatively, the start timing of the monitoring period is predefined or preconfigured. In addition, the UE monitors the sidelink grant and/or the sidelink grant for retransmission within a monitoring period. In one method, the monitoring period is controlled by a timer or a counter. In one method, a length of the monitoring period is configured by a BS. Alternatively, the length of the monitoring period is preconfigured or predefined in the UE.

In one embodiment, the UE starts/triggers a sidelink retransmission timer after the UE transmits the feedback of a sidelink transmission (e.g., a retransmission request indication) to the BS. In one method, the UE will start a Round-Trip Time (RTT) timer (for sidelink) after the transmission feedback of the sidelink transmission and before start of the sidelink retransmission timer. In one method, the RTT timer (for sidelink) is used for triggering/starting the sidelink retransmission timer and the sidelink retransmission timer is triggered/started by the UE after the RTT timer expires. In one method, a length of the RTT timer is configured by a BS. Alternatively, the length of the RTT timer is predefined. In another method, the RTT timer is maintained in a per UE manner. Alternatively, the RTT timer is maintained in per sidelink HARQ process manner. In one method, the RTT timer is different and/or independent from a RTT timer used for uplink and/or downlink. Alternatively, the RTT timer is the same timer or the shared same value as the RTT timer used for the uplink HARQ process. In one method, the sidelink retransmission timer is different and/or independent from a retransmission timer used for uplink and/or downlink. Alternatively, the sidelink retransmission timer is the same timer or the shared same value as the retransmission timer used for the uplink HARQ process.

Alternatively, the UE directly starts the sidelink retransmission timer in response to the transmission of the feedback of the sidelink transmission to the BS.

In another method, the sidelink retransmission timer is maintained in a per UE manner. Alternatively, the sidelink retransmission timer is maintained in a per sidelink HARQ process manner. Alternatively, the sidelink retransmission timer is a per sidelink HARQ process used for sidelink unicast communication or for a sidelink communication which needs HARQ feedback.

Figure 14:
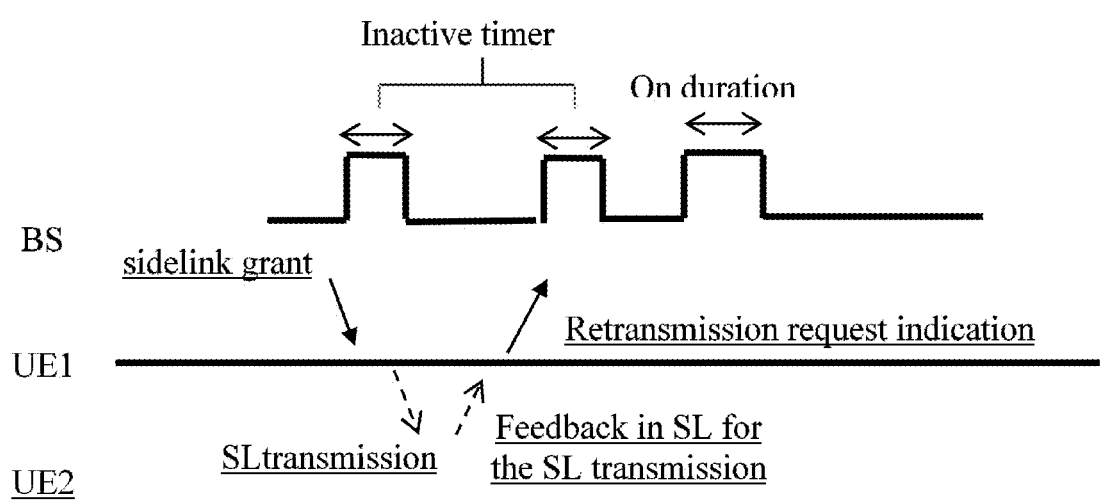
FIG. 14 illustrates one exemplary embodiment showing a start or restart of an inactivity timer for transmitting a feedback of a sidelink transmission to BS.

In another embodiment, a new condition for starting or restarting an inactivity timer (e.g. drx-InactivityTimer) is defined. In another method, the feedback of the sidelink transmission could start or restart the inactivity timer and keep the UE monitoring the PDCCH for sidelink grant and/or sidelink grant for retransmission. In another method, a UE starts or restarts the inactivity timer when the UE receives a sidelink grant for retransmission. Accordingly, the UE can prolong the possible scheduling time for the base station. In one method, the above-mentioned inactivity timer is the drx-InactivityTimer disclosed in 3GPP TS 38.321-f40. Alternatively, the above-mentioned inactivity-timer is another inactivity-timer for the sidelink. An example for the embodiment is shown in FIG. 14. After the UE performs a transmission of a retransmission request indication (e.g., the feedback for the sidelink transmission) to the BS, the UE starts the inactivity timer again.

For above methods and/or embodiment, the UE starts the timer and/or monitors the downlink control channel (e.g., coreset and/or PDCCH occasion) if the feedback of the sidelink transmission indicates a Negative Acknowledgement (NACK) or the need of a retransmission. Alternatively, the UE starts the timer and/or monitors downlink control channel (e.g. coreset and/or PDCCH occasion) regardless of the content of the feedback to the BS.

According to another method, the UE uses a Scheduling Request (SR) transmission for indicating the need for retransmission. The SR transmission is used for requesting a sidelink grant and/or a sidelink grant for retransmission (instead of the uplink grant). After the UE performs the SR for a sidelink grant and/or a sidelink grant for retransmission, the UE will start to monitor the downlink control channel (used for scheduling the sidelink grant and/or the sidelink grant for retransmission). In another method, the UE has no pending SR associated with the SR transmission.

Alternatively, if we treat a SR for the sidelink resource by the Medium Access Control (MAC) entity following the procedure of the SR for the uplink grant, based on current specification, the UE starts monitoring the PDCCH after the UE performs a SR transmission (for uplink) to the base station. On the other hand, the SR transmission is triggered by a pending SR. The pending SR is usually triggered by a Buffer Status Report (BSR) or a sidelink BSR. The pending SR will be cancelled when a MAC Protocol Data Unit (PDU) is assembled. The PDU includes a Sidelink BSR which contains a buffer status up to (and including) the last event that triggered a Sidelink BSR. However, if the pending SR for triggering the SR transmission is triggered by the retransmission request (or the HARQ NACK received in the sidelink interface) instead of a triggered sidelink BSR, then the pending SR will not be cancelled in any cases. And the pending SR will continuously trigger the SR transmission and the caused problem.

For the pending SR not triggered by the sidelink BSR, some possible ways for cancelling the pending SR are listed as follows. In one method, the pending SR of the SR transmission is cancelled when the UE receives a sidelink grant. In another method, the pending SR of the SR transmission is cancelled when the UE receives a sidelink grant for retransmission. In one method, the pending SR of the SR transmission is cancelled when the UE receives a sidelink grant corresponding to the sidelink transmission which triggered the pending SR. In one method, the pending SR of the SR transmission is cancelled when the Transfer Block (TB), which needs retransmission, is discarded, flushed, or overwritten.

In one method, the correspondence between a sidelink grant (or a sidelink for retransmission) and the sidelink transmission being performed is determined by a sidelink HARQ process ID/index. Alternatively, the correspondence between a sidelink grant (or a sidelink for retransmission) and the sidelink transmission being performed is determined by the reception timing of the sidelink grant (or a sidelink for retransmission). Alternatively, the correspondence between a sidelink grant (or a sidelink for retransmission) and the sidelink transmission being performed is determined by a field or an indication included in the sidelink grant (or a sidelink for retransmission). Alternatively, the correspondence between a sidelink grant (or a sidelink for retransmission) and the sidelink transmission being performed is determined by a transport block size indicated by the sidelink grant (or a sidelink for retransmission).

In one method, a UE starts or restarts an Inactive timer when the UE receives a sidelink grant for retransmission. By this way, it can prolong the possible scheduling time for the base station.

In one method, the UE performs the SR transmission (for sidelink) if the UE receives a NACK in a sidelink interface for a sidelink transmission or the UE does not receive a HARQ feedback corresponding to a sidelink transmission (which needs HARQ feedback in sidelink interface) in a sidelink interface. Alternatively, the UE performs the SR transmission (for sidelink) regardless of the HARQ feedback result in the sidelink interface for a sidelink transmission. The UE performs the SR transmission (for sidelink) if the SR transmission needs a HARQ feedback result in the sidelink interface or the UE is configured with or allocated with resource(s) for performing the SR transmission.

In one method, the UE monitors the downlink control channel (e.g., PDCCH, PDCCH occasion, and/or coreset) in response to performing the SR transmission (for sidelink) if the HARQ feedback result in the sidelink interface is a NACK or a Discontinuous Transmission (DTX) (i.e., receives no HARQ feedback).

According to another method, the a dedicated coreset/PDCCH monitoring occasion is allocated to receive a sidelink grant and/or sidelink grant retransmission. In NR, a concept called coreset is defined. A coreset is designed to limit a specific control resource set for a UE to perform decode. A smaller control resource set can reduce decoding overload in a UE, and a larger control resource set could let a BS schedule more transmissions for improving data rates. A similar concept is a PDCCH monitoring occasion. The fewer PDCCH monitoring occasions can reduce a UE's power consumption, and more PDCCH monitoring occasions can reduce scheduling latency.

In this method, a UE will be allocated to one or multiple coresets and/or sets of PDCCH monitoring occasions for monitoring a sidelink grant and/or a sidelink grant for retransmission. The balance between power consumption and data rates could be controlled by a BS by determining the size of coreset and/or the amount of PDCCH occasions. Alternatively, the UE is allocated one or multiple coresets and/or one or more sets of PDCCH monitoring occasions for monitoring a sidelink grant or a sidelink grant for retransmission.

In one method, the UE starts monitoring one or multiple coresets and/or set of PDCCH monitoring occasions in response to the transmission of the retransmission request indication to the BS.

In one method, if the coreset(s) and/or PDCCH occasion(s) are not shared with Uu scheduling, a UE applies another Discontinuous Reception (DRX) mechanism for the coresets and/or PDCCH occasion for controlling the power consumption and decoding complexity. In one method, the DRX mechanism means the same procedure with different configurations (e.g., length of timer, start offset, DRX period).

In another method, the UE does not apply the DRX mechanism to the PDCCH monitoring of the sidelink grant and/or sidelink grant for retransmission. In one method, the UE does not apply the DRX mechanism to a Radio Network Temporary Identifier (RNTI) used for scheduling sidelink grant and/or sidelink grant for retransmission. In one method, one or multiple coresets and/or one or multiple sets of PDCCH occasions of the sidelink grant are separated from the coresets and/or PDCCH occasion sets used for Uu scheduling (e.g. UL grant, DL assignment). Alternatively, the coreset(s) and/or PDCCH occasion set(s) of the sidelink grant are shared or are the same as the coreset and/or PDCCH occasions used for Uu scheduling (e.g. UL grant, DL assignment). By removing DRX, the UE could always be able to receive a sidelink grant and/or sidelink grant for retransmission. In one method, one or multiple coresets and/or one or multiple set of the PDCCH occasions of the sidelink grant for retransmission are separated from the coresets and/or the PDCCH occasion sets used for Uu scheduling (e.g. UL grant, DL assignment).

Figure 13:
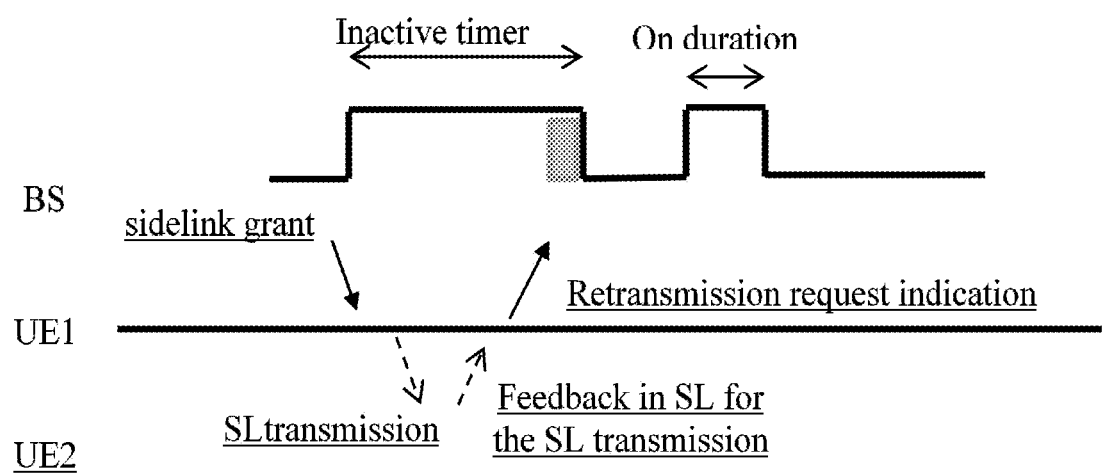
FIG. 13 illustrates one exemplary embodiment showing a long enough inactivity timer.

In another method, the Inactivity timer is configured with a large enough value for covering any scheduling delay from a new transmission until retransmission. In this method, the network (e.g., BS) will need to allocate a long enough timer value to cover any potential future scheduling. Following LTE V2X design, a UE will start or restart an inactivity timer in response to receiving a sidelink grant for a new transmission. In order to prevent issues, the network could allocate a long enough inactivity timer value for scheduling a potential sidelink grant for retransmission or another sidelink grant. The time relationship is shown in FIG. 13. As shown in FIG. 13, the inactivity timer is longer than a whole round trip transmission and the processing time in the sidelink interface. The gray area is the time for the network to schedule a potential sidelink grant for retransmission or another sidelink grant. More specifically, the inactivity timer is longer than the maximum time for a whole round trip transmission and the processing time for a sidelink transmission which needs the sidelink HARQ feedback in the sidelink interface plus the processing and transmission delay for the retransmission request indication.

In another method, the UE starts to monitor a downlink control channel when receiving HARQ feedback from another device in a sidelink interface. After a first UE performs a sidelink transmission to a second UE through a sidelink interface, the first UE monitors a HARQ feedback for the sidelink transmission in the sidelink interface. The first UE needs to transmit a feedback and/or a retransmission request indication to a BS for indicating whether the sidelink transmission needs a retransmission. Since issues may be caused by not monitoring a downlink control channel, the first UE starts monitoring the downlink control channel when the first UE determines that the HARQ feedback result for the sidelink transmission in the sidelink interface. More specifically, the first UE determines the HARQ feedback as a NACK if the first UE receives the NACK from the second UE. The first UE determines the HARQ feedback as an ACK if the first UE receives the ACK from the second UE. The first UE determines the HARQ feedback as a NACK or DTX if the first UE does not receive a corresponding HARQ feedback from the second UE.

In one method, the first UE starts monitoring the downlink control channel when the first UE determines the HARQ feedback result for the sidelink transmission in the sidelink interface as a NACK or DTX. Alternatively, the first UE starts monitoring the downlink control channel regardless of the HARQ feedback result.

In one method, the UE transmits the feedback and/or the retransmission request indication to the BS if the UE determines the HARQ feedback result as a NACK or DTX. Alternatively, the UE transmits the feedback and/or the retransmission request indication to the BS regardless of the HARQ feedback result, but the contents of or the format of the feedback and/or the retransmission request indication will be different depending on the HARQ feedback result.

For some of the above-disclosed methods, the UE is in RRC_CONNECTED. In one method, the UE is configured with a network scheduling mode (i.e., mode 1). In one method, the UE is configured with a dual mode (i.e., both mode 1 and mode 2). In one method, the sidelink grant and the sidelink grant for retransmission have different Downlink Control Information (DCI) format. Alternatively, the sidelink grant and the sidelink grant for retransmission share the same DCI format. In one method, the sidelink transmission is or includes a sidelink data transmission (e.g., SL-SCH, data belongs to SL logical channel). In one method, the sidelink transmission is a sidelink unicast transmission. Alternatively, the sidelink transmission is a sidelink groupcast transmission. In one method, the sidelink transmission includes a sidelink control information transmission.

According to one exemplary method for a first device to monitor down control signal for scheduling sidelink resource, the includes: performing a sidelink transmission to a second device based on a first sidelink grant allocated by a base station; determining a retransmission need of the sidelink transmission based on a first sidelink resource used for monitoring feedback of the sidelink transmission from the second device; transmitting a retransmission indication for the retransmission need to the base station; and monitoring a downlink control resource set in response to the transmission of the retransmission indication.

In another exemplary method, the sidelink transmission is an unicast transmission.

In another exemplary method, the sidelink transmission needs to receive HARQ feedback from the second device through sidelink interface.

In another exemplary method, the first sidelink grant allocates a second sidelink resource for the sidelink transmission.

In another exemplary method, the first sidelink grant allocates a first uplink resource for the transmission of the retransmission indication.

In another exemplary method, the first sidelink resource is determined by the second sidelink resource.

In another exemplary method, the first device transmits the retransmission indication to the base station if the UE does not receive the feedback from the second device.

In another exemplary method, the first device transmits the retransmission indication to the base station if the feedback from the second device indicates reception failure of the sidelink transmission.

In another exemplary method, the first device starts or restarts a timer in response to the transmission of the retransmission indication, wherein the timer is used for controlling period of the monitoring.

In another exemplary method, the timer is an Inactivity-timer (e.g. drx-InactivityTimer).

In another exemplary method, the timer is a new timer different from the Inactivity-timer (i.e. drx-InactivityTimer).

In another exemplary method, the downlink control resource set is a PDCCH channel.

In another exemplary method, the downlink control resource set includes a set of PDCCH occasion(s).

In another exemplary method, the downlink control resource set is a coreset.

In another exemplary method for a first device to monitor down control signal for scheduling sidelink resource, the method includes: performing a sidelink transmission to a second device based on a first sidelink grant allocated by a base station; determining a retransmission need of the sidelink transmission based on a first sidelink resource used for monitoring feedback of the sidelink transmission from the second device; transmitting a retransmission indication for the retransmission need to the base station; starting a first timer in response to transmission of the retransmission indication; and monitoring a downlink control resource set after the first timer expires.

In another exemplary method, the sidelink transmission is an unicast transmission.

In another exemplary method, the sidelink transmission needs to receive a HARQ feedback from the second device through a sidelink interface.

In another exemplary method, the first sidelink grant allocates a second sidelink resource for the sidelink transmission.

In another exemplary method, the first sidelink grant allocates a first uplink resource for the transmission of the retransmission indication.

In another exemplary method, the first sidelink resource is determined by the second sidelink resource.

In another exemplary method, the first device transmits the retransmission indication to the base station if the UE does not receive the feedback from the second device.

In another exemplary method, the first device transmits the retransmission indication to the base station if the feedback from the second device indicates reception failure of the sidelink transmission.

In another exemplary method, the first timer is a timer for not monitoring the downlink control resource set.

In another exemplary method, the first timer is a timer for determining when to start a second timer.

In another exemplary method, the first timer is a RTT timer (for a sidelink).

In another exemplary method, the first timer is a timer for a sidelink HARQ process.

In another exemplary method, the first device starts a second timer when monitoring the downlink control resource set.

In another exemplary method, the first device starts a second timer when the first timer expires.

In another exemplary method, the second timer is used for controlling a period of the monitoring.

In another exemplary method, the second timer is a timer for a sidelink HARQ process.

In another exemplary method, the second timer is a retransmission timer (for a sidelink).

In another exemplary method, the downlink control resource set is a PDCCH channel.

In another exemplary method, the downlink control resource set includes a set of PDCCH occasion(s).

In another exemplary method, the downlink control resource set is a coreset.

In another exemplary method, the first device receives a second sidelink grant when monitoring the control resource set; and uses the second sidelink grant to perform a retransmission of the sidelink transmission to the second device.

In another exemplary method for a first device to monitor down control signal for scheduling sidelink resource, the method includes: triggering a SR for a retransmission need of a sidelink transmission; performing a SR transmission for the SR to a base station; cancelling the SR when receiving a scheduling for the sidelink transmission; stop performing SR transmission for the SR after the SR is cancelled.

In another exemplary method, the sidelink transmission is an unicast transmission.

In another exemplary method, the SR is associated with a first SR configuration.

In another exemplary method, the association between the SR and the first SR configuration is configured by the base station.

In another exemplary method, the scheduling for the sidelink transmission is a sidelink grant.

In another exemplary method, the scheduling for the sidelink transmission is a sidelink grant for retransmission.

In another exemplary method, the first device determines the sidelink grant for retransmission is the scheduling for the sidelink transmission based on a HARQ process Index/ID indicated in the sidelink grant.

In another exemplary method, the first device determines the sidelink grant for retransmission is the scheduling for the sidelink transmission based on a received timing of the sidelink grant for retransmission.

In another exemplary method, the first device determines the sidelink grant for retransmission is the scheduling for the sidelink transmission based on a field in the sidelink grant for retransmission.

In another exemplary method, the first device determines the sidelink grant for retransmission is the scheduling for the sidelink transmission based on a transport block size field in the sidelink grant for retransmission.

In another exemplary method, the first device does not cancel the SR when the first device receives a first sidelink grant for a new transmission.

In another exemplary method, the first device does not cancel the SR when the first device receives a second sidelink grant for retransmission, wherein the second sidelink grant is not for the sidelink transmission.

Figure 15:
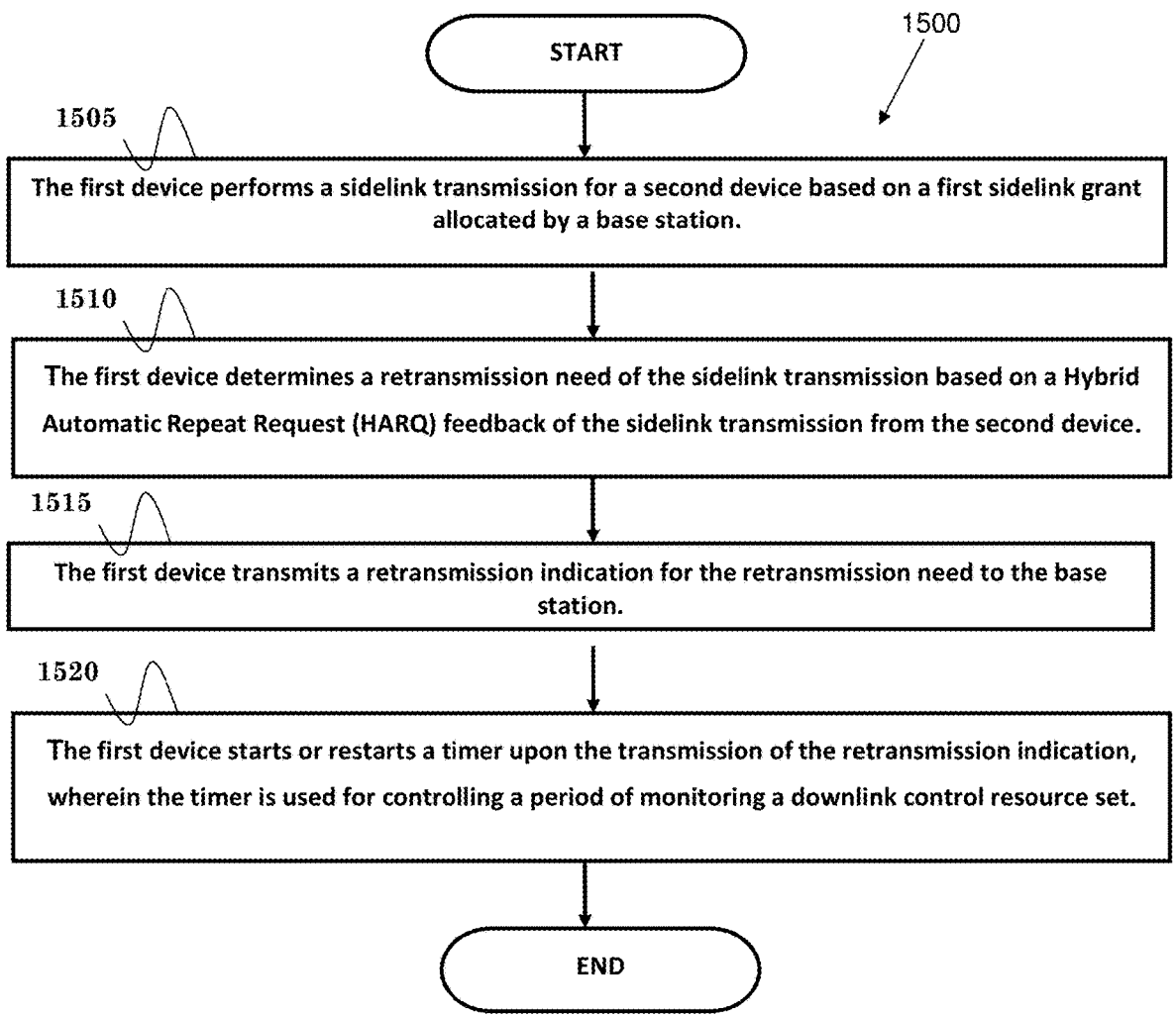
FIG. 15 is a flow diagram for one exemplary embodiment from the perspective of a User Equipment (UE).

FIG. 15 is a flow chart 1500 according to one exemplary embodiment from the perspective of a first device such as, but not limited to, a UE, wherein the first device monitors a down control signal for scheduling sidelink resource. In step 1505, the first device performs a sidelink transmission for a second device based on a first sidelink grant allocated by a base station. In step 1510, the first device determines a retransmission need of the sidelink transmission based on a Hybrid Automatic Repeat Request (HARQ) feedback of the sidelink transmission from the second device. In step 1515, the first device transmits a retransmission indication for the retransmission need to the base station. In step 1520, the first device starts or restarts a timer upon the transmission of the retransmission indication, wherein the timer is used for controlling a period of monitoring a downlink control resource set.

In another method, the sidelink transmission needs to receive the HARQ feedback from the second device through a sidelink interface.

In another method, the first device transmits the retransmission indication to the base station if the first device does not receive the HARQ feedback from the second device.

In another method, the first device transmits the retransmission indication to the base station if the HARQ feedback from the second device indicates a reception failure of the sidelink transmission.

In another method, the timer is a drx-InactivityTimer or a drx-RetransmissionTimerSL.

In another method, the downlink control resource set is a Physical Dowlink Control Channel (PDCCH) or a coreset.

In another method, the downlink control resource set includes a set of PDCCH occasions.

As those skilled in the art will appreciate, the various disclosed embodiments and/or methods may be combined to form new embodiments and/or methods.

Referring back to FIGS. 3 and 4, in one embodiment, the device 300 includes a program code 312 stored in memory 310, wherein the device 300 monitors a down control signal for scheduling sidelink resource. The CPU 308 could execute program code 312 to (i) perform a sidelink transmission for a second device based on a first sidelink grant allocated by a base station, (ii) determine a retransmission need of the sidelink transmission based on a Hybrid Automatic Repeat Request (HARQ) feedback of the sidelink transmission from the second device, (iii) transmit a retransmission indication for the retransmission need to the base station, (iv) start or restart a timer upon the transmission of the retransmission indication, wherein the timer is used for controlling a period of monitoring a downlink control resource set.

Furthermore, the CPU 308 can execute the program code 312 to perform all of the above-described actions and steps or others methods described herein.

The above-disclosed methods allow a UE to be immediately scheduled by a base station for sidelink retransmission needs.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first device to monitor down control signal for scheduling sidelink resource, the method comprising:
   performing a sidelink transmission for a second device based on a first sidelink grant allocated by a base station;
   determining a retransmission need of the sidelink transmission based on a Hybrid Automatic Repeat Request (HARQ) feedback of the sidelink transmission received from the second device;
   transmitting a retransmission indication for the retransmission need to the base station; and
   starting or restarting a timer upon the transmission of the retransmission indication, wherein the timer is used for controlling a round-trip time (RTT).

2. The method of claim 1, wherein the HARQ feedback of the sidelink transmission is received from the second device through a sidelink interface.

3. The method of claim 1, further comprising:
   transmitting the retransmission indication to the base station if the first device does not receive the HARQ feedback from the second device.

4. The method of claim 1, further comprising:
transmitting the retransmission indication to the base station if the HARQ feedback from the second device indicates a reception failure of the sidelink transmission.

5. The method of claim 1, wherein the timer is a RTT timer for sidelink.

6. The method of claim 1, wherein the downlink control resource set is a Physical Dowlink Control Channel (PDCCH) or a coreset.

7. The method of claim 1, wherein the downlink control resource set includes a set of PDCCH occasions.

8. The method of claim 1, wherein the timer is used for triggering start of a retransmission timer for sidelink.

9. The method of claim 8, wherein the retransmission timer for sidelink is used for controlling a period of monitoring a downlink control resource set.

10. A first device, the first device comprising:
a control circuit;
a processor installed in the control circuit; and
a memory installed in the control circuit and coupled to the processor;
wherein the processor is configured to execute a program code stored in the memory to:
perform a sidelink transmission for a second device based on a first sidelink grant allocated by a base station;
determine a retransmission need of the sidelink transmission based on a Hybrid Automatic Repeat Request (HARQ) feedback of the sidelink transmission received from the second device;
transmit a retransmission indication for the retransmission need to the base station; and
start or restart a timer upon the transmission of the retransmission indication, wherein the timer is used for controlling a round-trip time (RTT).

11. The first device of claim 10, wherein the HARQ feedback of the sidelink transmission is received from the second device through a sidelink interface from the second device through a sidelink interface.

12. The first device of claim 10, wherein the processor is configured to execute the program code to transmit the retransmission indication to the base station if the first device does not receive the HARQ feedback from the second device.

13. The first device of claim 10, wherein the processor is configured to execute the program code to transmit the retransmission indication to the base station if the HARQ feedback from the second device indicates a reception failure of the sidelink transmission.

14. The first device of claim 10, wherein the timer is a RTT timer for sidelink.

15. The first device of claim 10, wherein the downlink control resource set is a Physical Dowlink Control Channel (PDCCH) or a coreset.

16. The first device of claim 10, wherein the downlink control resource set includes a set of PDCCH occasions.

17. The first device of claim 10, wherein the timer is used for triggering start of a retransmission timer for sidelink.

18. The first device of claim 17, wherein the retransmission timer for sidelink is used for controlling a period of monitoring a downlink control resource set.

* * * * *